United States Patent [19]
Hamanishi

[11] Patent Number: 5,136,430
[45] Date of Patent: Aug. 4, 1992

[54] INNER FOCUSING TYPE TELEPHOTO ZOOM LENS

[75] Inventor: Yoshinari Hamanishi, Wako, Japan

[73] Assignee: Nikon Corporation, Tokyo, Japan

[21] Appl. No.: 685,142

[22] Filed: Apr. 15, 1991

[30] Foreign Application Priority Data

Apr. 19, 1990 [JP] Japan .................................. 2-103661

[51] Int. Cl.⁵ ............................................ G02B 15/14
[52] U.S. Cl. .................................... 359/676; 359/684; 359/713
[58] Field of Search ............... 359/676, 713, 683, 684, 359/708

[56] References Cited

U.S. PATENT DOCUMENTS

| | | | |
|---|---|---|---|
| 4,110,006 | 8/1978 | Ikemori | 350/186 |
| 4,752,121 | 6/1988 | Kitagishi | 350/427 |
| 4,848,883 | 7/1989 | Maruyama | 350/427 |
| 5,042,927 | 8/1991 | Ogawa et al. | 359/676 |
| 5,048,939 | 9/1991 | Yatsu et al. | 359/676 |
| 5,050,972 | 9/1991 | Mukaiya et al. | 359/676 |
| 5,061,051 | 10/1991 | Miyamae | 359/676 |

Primary Examiner—Janice A. Howell
Assistant Examiner—Kiet T. Nguyen
Attorney, Agent, or Firm—Shapiro and Shapiro

[57] ABSTRACT

An inner focusing type telephoto zoom lens includes a fixed first lens group having a positive refractive power, the first lens group being disposed closest to the object, a second lens group having a negative refractive power, the second lens group being movable along an optical axis for focusing, a fixed third lens group having a positive refractive power, a fourth lens group having a negative refractive power, the fourth lens group being movable along the optical axis for zooming, a fifth lens group having a positive refractive power, the fifth lens group being movable along the optical axis relative to the fourth lens group, and a fixed sixth lens group having a positive refractive power. The zoom lens satisfies the following condition:

$$0.4 < |f_2|/f_{123} < 0.9$$

where $f_{123}$ is a composite focal length of the first, second and third lens groups, and $f_2$ indicates a focal length of the second lens group.

32 Claims, 6 Drawing Sheets

INNER FOCUSING TYPE TELEPHOTO ZOOM LENS

BACKGROUND OF THE INVENTION

1. Field of the Invention

The present invention relates to a telephoto zoom lens, and more particularly, to an inner focusing type fast supertelephoto zoom lens in which part of lens groups in the lens system is movable for focusing.

2. Related Background Art

Automation of various control devices for use in a camera has taken place in recent years. Single-lens reflex cameras with an autofocusing (hereinafter referred to as an 'AF') device provided therein have been available. Autofocusing of fast supertelephoto zoom lenses for use in such an AF camera has encountered the following difficulties.

The telephoto zoom lenses of the above-described type are long, and the distal end portion thereof is heavy. Conventionally, such telephoto zoom lenses are mainly of the front focusing type in which a lens group having a large diameter and located closest to an object is moved as a lens group which is movable along an optical axis for focusing (hereinafter referred to as a 'focusing lens group').

Although this front focusing method has an advantage in that it can be accomplished by a simple lens configuration, the focal length of the front lens group which is movable for focusing is very long, and the distance through which the front lens group is moved for focusing is thus large. Furthermore, as the aperture ratio increases, the outer diameter of the zoom lens increases, thereby increasing the weight thereof. Therefore, in the front focusing method, the workload, i.e., the load, of the driving device for accomplishing autofocusing is greatly increased. This hinders autofocusing of the above-described type of lens.

The front focusing method also suffers from problems in that the marginal lumination is decreased and the center of gravity of the lens is shifted due to changes in the overall length of the zoom lens caused by the movement of the front lens group movable for focusing, which is conducted at a close focusing distance, and in that the shortest object distance cannot be reduced sufficiently.

In order to overcome these problems, it has been proposed to construct the lens portion located closer to the object than a lens group which is movable for changing magnification (hereinafter referred to as 'a magnification changing lens group') using a plurality of lens groups and to make movable for focusing the lens group located farthest from the object in these plurality of lens groups or part of the lens groups located in the intermediate portion of these plurality of lens groups. Such inner focusing type telephoto zoom lenses have been proposed in, for example, (a) Japanese Patent Publication Nos. 59-4688 and 62-53696, (b) Japanese Patent Laid-Open No. 63-188110, and (c) Japanese Patent Laid-Open No. 59-23314.

However, the zoom lenses classified as (a) to (c) have the following problems.

In the zoom lenses itemized in (a), since the diameter of the focusing lens group disposed farthest from the object is substantially the same as that of the lens group having the large diameter and located closest to the object and thus is not very small, the weight of the focusing lens group is increased. Furthermore, since the refractive power of the focusing lens group is weak, the movement of the lens group for focusing is increased. Consequently, the load of the driving device is increased, and the size of the lens barrel is also increased.

In the zoom lens itemized in (b), although the diameter of the focusing lens group disposed farthest from the object is slightly smaller than that of the zoom lens itemized in (a), it is not small enough to decrease the load of the driving device. Furthermore, when the zooming ratio of the zoom lens is increased by enlarging the magnification changeable range toward the wideangle side, the image quality deteriorates when the zoom lens is used at the telephoto end due to the curvature of image of color (g line) which occurs at the edge of the image field.

In the zoom lens itemized in (c), the focusing lens group is located between the fixed lens disposed closest to the object and the other fixed lens disposed at the rear of that fixed lens, and has small diameter and large refractive power. Therefore, both the weight and movement of the focusing lens group are small. However, since the aperture stop is located between the focusing lens group and the other fixed lens located at the rear of the fixed lens disposed closest to the object, the exit pupil of the zoom lens used at the wideangle end is shifted from the image field through a large distance. Consequently, in order to provide an amount of necessary light, the diameter of the lens group located closest to the image field is increased, and enlargement of the magnification changeable range toward the wideangle end is difficult. This in turn makes an increase in the zooming ratio difficult. Furthermore, the accuracy of the distance detection system in the AF device deteriorates.

Thus, in the telephoto zoom lenses disclosed in (a) to (c), the compact form and sufficient degree of autofocusing are not compatible.

SUMMARY OF THE INVENTION

In view of the aforementioned problems of the conventional zoom lenses, an object of the present invention is to provide an inner focusing type telephoto zoom lens which enables the workload required for focusing a focusing lens group to be reduced so as to achieve sufficient degree of autofocusing, which ensures a marginal lumination, which has a compact shape and a high zooming ratio, and which exhibits an excellent image forming performance over the entire zooming range from the wideangle end to the telephoto end at a focusing distance ranging from the infinity to the close distance.

In order to achieve the aforementioned object, the present invention provides a zoom lens which comprises a fixed first lens group having a positive refractive power, the first lens group being disposed closest to the object, a second lens group having a negative refractive power, the second lens group being movable along an optical axis, a fixed third lens group having a positive refractive power, a fourth lens group having a negative refractive power, the fourth lens group being movable along the optical axis, a fifth lens group having a positive refractive power, the fifth lens group being movable along the optical axis relative to the fourth lens group, and a fixed sixth lens group having a positive refractive power. Zooming is performed by moving the fourth and fifth lens groups relative to each other. Focusing is made on objects located on a close focusing distance by moving the second lens group toward the image. The zoom lens according to the present invention satisfies the following condition:

$$0.4 < |f_2|/f_{123} < 0.9$$

where $f_2$ indicates the focal length of the second lens group and $f_{123}$ is the composite focal length of the first, second and third lens groups.

According to the present invention, it is possible to provide an inner focusing method which has a large aperture ratio, which allows a focusing lens group to be small in size and weight, and which is thus capable of coping with autofocusing sufficiently. It is therefore possible to provide a telephoto zoom lens which exhibits an excellent image forming performance in the overall zooming range from the wideangle end to the telephoto end and at a focusing distance ranging from the infinity to the close distance, and which has a high zooming ratio.

In the fast supertelephoto zoom lens according to the present invention, whereas a zooming ratio as large as three times is achieved, the overall length of the optical system is fixed and the overall size thereof is very short and small in size.

Furthermore, since the magnification changing lens group and the focusing lens group are provided separately, a lens configuration which is desirable for both autofocusing and manual focusing is provided.

Other objects, features and advantages of the present invention will be apparent from the following description taken in connection with the accompanying drawings.

DESCRIPTION OF THE PREFERRED EMBODIMENTS

Embodiments of the present invention will now be described with reference to the accompanying drawings.

FIGS. 1 to 6 respectively show the first to sixth embodiments of the lens configuration according to the present invention. In each embodiment, the focal length is variable in the range from 200 to 600 and F number is 5.6.

Figure 1:
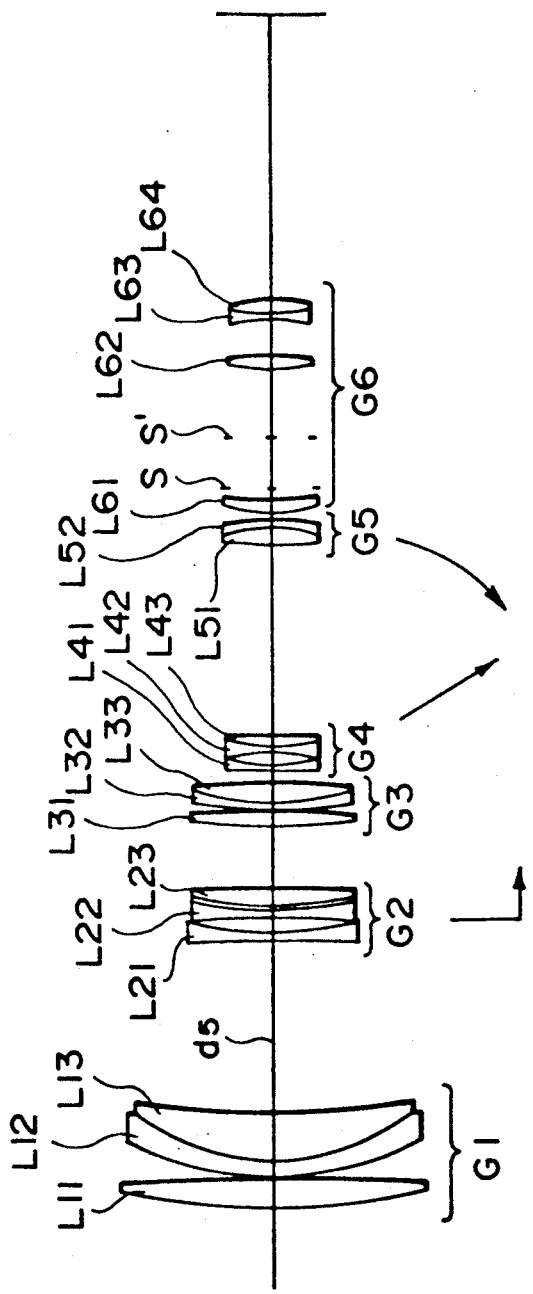
FIG. 1 shows a first embodiment of a lens configuration according to the present invention which is focused to the infinity.

FIG. 1 shows the first embodiment of the lens configuration according to the present invention. The configuration of the first embodiment is basically the same as that of the second, third and fifth embodiments.

Since there is a tendency that the overall length of the fast supertelephoto zoom lens is increased, a compact supertelephoto zoom lens having a small telephoto ratio is required. In that case, it is desired that the refractive power of each lens group in the lens system be made as large as the optical image forming performance permits.

The fast supertelephoto zoom lens has a very long focal length. Therefore, each lens group has a very large lens diameter. Although it is desired that the workload required for moving a focusing lens group for focusing be small in order to cope with autofocusing, an increase in the lens diameter increases the workload required in the operation.

As shown in FIGS. 1 to 6, the zoom lens according to the present invention includes a first lens group $G_1$ having a positive refractive power, a second lens group $G_2$ having a negative refractive power and the focusing function, a third lens group $G_3$ having a positive refractive power, a fourth lens group $G_4$ having a negative refractive power and the magnification changing function, a fifth lens group $G_5$ having a positive refractive power and the image field correcting function when the magnification is changed, and a sixth lens group $G_6$ having a positive refractive power and the image forming function. The zoom lens according to the present invention is capable of coping with autofocusing sufficiently. At the same time, the overall length of the lens system is short and the lens size is compact. Furthermore, the exit pupil is close to the image, a sufficient marginal lumination is provided, and an increase in the zooming ratio is made possible.

Furthermore, the refractive power of the second lens group $G_2$ which is the focusing lens group is intensified as much as possible, and the space $d_5$ between the first and second lens groups $G_1$ and $G_2$ is increased to an extent which does not increase the overall length of the zoom lens. Consequently, the movement of the second lens group $G_2$ for focusing can be reduced, and the closest focusing distance can be shortened. Also, the diameter of the bundle of rays incident to the second lens group $G_2$ can be reduced so as to reduce the diameter of the second lens group $G_2$ which is the focusing lens group.

Thus, in the telephoto zoom lens according to the present invention, the workload required to move the second lens group $G_2$ for focusing can greatly be reduced. This makes provision of a fast supertelephoto zoom lens which is capable of coping with autofocusing sufficiently possible.

Furthermore, in the present invention, since the focusing lens group is the second lens group $G_2$ which is disposed closer to the object than the fourth lens group $G_4$ having the magnification changing function and which is movable along the optical axis independent of the fourth lens group $G_4$, as stated above, it is possible to provide an inner focusing type fast supertelephoto zoom lens which eliminates shifting of focus caused by zooming and which is capable of coping with autofocusing.

In order to achieve an inner focusing type fast supertelephoto zoom lens which is capable of coping with autofocusing sufficiently, it is also required that the following condition be satisfied $$0.4 < |f_2|/f_{123} < 0.9 \qquad (1)$$

where $f_2$: the focal length of the second lens group $G_2$ $f_{123}$: the composite focal length of the first, second and third lens groups.

The condition (1) defines the optimal ratio of the focal length of the second lens group $G_2$ relative to the composite focal length of the first to third lens groups disposed closer to an object than the fourth lens group $G_4$ having the magnification changing function.

A ratio which is smaller than the lower limit defined by Condition (1) increases the refractive power of the second lens group $G_2$ (the focusing lens group) excessively, thus increasing variations in the aberrations generated when the lens is focused at the infinity and at the close distance. Alternatively, a ratio smaller than the lower limit lessens the refractive power of the first to third lens groups excessively, thereby making reduction in the size of each lens group impossible.

A ratio which is larger than the upper limit defined by Condition (1) lessens the refractive power of the second lens group $G_2$ (the focusing lens group) excessively, thereby increasing the movement of the second lens group $G_2$ when the focusing distance is close. Consequently, quick focusing operation is inhibited. Also, the space between the second and third lens groups $G_2$ and $G_3$ must be increased sufficiently, thus increasing the overall length of the zoom lens. Also, a ratio which is larger than the upper limit increases the diameter of the bundle of rays incident on the second lens group $G_2$ (the focusing lens group), thus increasing the effective diameter and hence the weight of the second lens group $G_2$ (the focusing lens group). As a result, the resultant zoom lens cannot cope with autofocusing. Also, a ratio larger than the upper limit increases the refractive power of the first to third lens groups $G_1$ to $G_3$ excessively, thus making correction of the spherical aberration at the telephoto end difficult due to excess load of virtual brightness of the first to third lens groups $G_1$ to $G_3$.

Chromatic aberration is the essential factor for determining the image forming performance of the fast supertelephoto zoom lens. Particularly, correction of the lateral chromatic aberration at the wideangle and telephoto sides and correction of the axial and lateral chromatic aberrations at the telephoto side at the closest focusing distance are important and difficult.

To correct the above-described chromatic aberrations, the first lens group $G_1$ must contain at least positive and negative lenses and satisfy the following condition:

$$40 = \nu_{1p} - \nu_{1n} < 70 \qquad (2)$$

where $\nu_{1p}$: the average Abbe number of the positive lens in the first lens group $G_1$
$\nu_{1n}$: the average Abbe number of the negative lens in the first lens group $G_1$.

When the difference in the Abbe number is smaller than the lower limit defined by Condition (2), axial and lateral chromatic aberrations at the telephoto end and those at the closest focusing distance are corrected insufficiently. When the difference in the Abbe number is larger than the upper limit defined by Condition (2), axial and lateral chromatic aberrations at the telephoto end and at the focusing distance of both infinity and the close distance are corrected excessively. Also, it is difficult to construct the telephoto lens by an inexpensive glass material.

To achieve more excellent correction of chromatic aberration, the first, second and third lens groups $G_1$, $G_2$ and $G_3$ respectively have at least one positive lens and at least one negative lens, and the positive and negative lenses in at least one pair in the first, second and third lens group $G_1$, $G_2$ or $G_3$ are cemented such that a cemented surface thereof is convex and located on the object side or are separated such that they have a meniscus air lens whose surface located on the object side is convex (hereinafter the above-described configurations itemized by (1) and (2) are referred to as achromatic configurations).

That is, non-axial light is refracted in the overall zooming range by the cemented surface whose surface located on the object side is convex or by the meniscus air lens whose surface located on the object side is convex. Consequently, even when the zooming ratio is increased, generation of the curvature of the field of the color (g line) is lessened, and the image forming performance at the edge of the image field at the telephoto end can be assured.

Chromatic aberration can be more effectively corrected when the above-described achromatic configuration is provided in at least the second lens group $G_2$ having the focusing function. At that time, the following condition is satisfied.

$$10 < \nu_{2n} - \nu_{2p} < 40 \qquad (3)$$

where $\nu_{2p}$: The average Abbe number of the positive lens in the second lens group $G_2$.
$\nu_{2n}$: The average Abbe number of the negative lens in the second lens group $G_2$.

When the difference in the Abbe number is smaller than the lower limit defined by Condition (3), the axial and lateral chromatic aberrations of the second lens group $G_2$ are corrected less, thus necessitating for intensification in the refractive power of the cemented surface provided for achromatic purpose or for intensification in the convexity of the convex surface of the meniscus air lens which is located on the object side. Consequently, high order of chromatic aberration is generated. Particularly, the lateral chromatic aberration curve at the wideangle end is great in the positive direction. In order to avoid generation of this chromatic aberration, the achromatic configuration must be intensified, which is undesirable. When the difference in the Abbe number is larger than the upper limit defined by Condition (3), the chromatic aberration in the second lens group $G_2$ is corrected excessively. Furthermore, Petzval's sum is increased negatively. An adequate glass material for the second lens group $G_2$ which can correct this is not known.

To achieve sufficient correction of the aberration, the first lens group $G_1$ is comprised of a positive front subgroup and a positive rear subgroup while the second and fourth lens groups $G_2$ and $G_4$ are respectively comprised of a negative front subgroup and a negative rear subgroup, and the following conditions are satisfied.

$$0.3 < f_{1F}/f_{1R} < 1.0 \qquad (4)$$

$$0.1 < f_{2F}/f_{2R} < 7 \qquad (5)$$

$$0.3 < \frac{rb + ra}{rb - ra} < 0.6 \qquad (6)$$

$$-1 < \frac{rd + rc}{rd - rc} < 8 \qquad (7)$$

$$-0.2 \frac{rf + rc}{rf - rc} < 0.2 \tag{8}$$

$$0.01 < f_T/f_{12} < 0.3 \tag{9}$$

where $f_{1F}$: The focal length of the front subgroup $G_{1F}$ in the first lens group $G_1$ $f_{1R}$: The focal length of the rear subgroup $G_{1F}$ in the first lens group $G_1$ $f_{2F}$: The focal length of the front subgroup $G_{1F}$ in the second lens group $G_1$ $f_{2R}$: The focal length of the rear subgroup $G_{1F}$ in the second lens group $G_1$ $r_a$: The radius of curvature of the surface disposed closest to the object in the front subgroup $G_{1F}$ in the first lens group $G_1$ $r_b$: The radius of curvature of the surface disposed closest to the image field in the front subgroup $G_{1F}$ in the first lens group $G_1$ $r_c$: The radius of curvature of the surface disposed closest to the object in the rear subgroup $G_{2F}$ in in second lens group $G_2$ $r_d$: The radius of curvature of the surface disposed closest to the image field in the rear subgroup $G_{2F}$ in the second lens group $G_2$ $r_e$: The radius of curvature of the surface disposed closest to the object in the air lens formed between the front and rear subgroups $G_{4F}$ and $G_{4R}$ n the fourth lens group $G_4$ rf: The radius of curvature of the surface disposed closest to the image field in the air lens formed between the front and rear subgroups $G_{4F}$ and $G_{4R}$ n the fourth lens group $G_4$ $f_{12}$: The composite focal length of the first and second lens groups $G_1$ and $G_2$ $f_T$: The focal distance of the zoom lens at the telephoto end.

Condition (4) defines the ratio of the optimal focal length of the front subgroup $G_{1F}$ relative to the rear subgroup $G_{1R}$ in the first lens group $G_1$. A ratio which is smaller than the lower limit defined by Condition (4) intensifies the spherical aberration and astigmatism in the negative direction at the telephoto end, which cannot be easily corrected in other lens groups. Conversely, a ratio which is larger than the upper limit defined by Condition (4) intensifies the spherical aberration and astigmatism in the positive direction at the telephoto end, and particularly, deteriorates the image quality at the edge of the image field at the telephoto end greatly.

Condition (5) defines the ratio of the optimal focal length of the front subgroup $G_{1F}$ relative to the rear subgroup $G_{2R}$ in the second lens group $G_2$. A ratio which is smaller than the lower limit defined by Condition (5) undesirably intensifies the astigmatism in the positive direction at the telephoto end. In contrast, a ratio which is larger than the upper limit defined by Condition (5) undesirably intensifies the astigmatism in the negative direction at the telephoto end.

Condition (6) defines the optimal shape factor of the front subgroup $G_{1F}$ in the first lens group $G_1$. A shape factor which is smaller than the lower limit defined by Condition (6) undesirably intensifies the astigmatism in the negative direction over the entire zooming range and spherical aberration in the negative direction at he telephoto end. In contrast, a shape factor which is larger than the upper limit defined by Condition (6) undesirably intensifies the annular spherical aberration at the telephoto end and the astigmatism in the positive direction.

Condition (7) defines the optimal shape factor of the rear subgroup $G_{2R}$ in the second lens group $G_2$. A shape factor which is smaller than the lower limit defined by Condition (7) undesirably intensifies the spherical aberration in the positive direction and the astigmatism in the negative direction. Also, a shape factor which is smaller than the lower limit undesirably generates mechanical interference between the third and fourth lens groups $G_3$ and $G_4$ at the wideangle end. Conversely, a shape factor which is larger than the upper limit defined by Condition (7) undesirably intensifies the spherical aberration in the negative direction and the astigmatism in the positive direction.

Condition (8) defines the optical shape factor of the air lens formed between the front and rear subgroups $G_{4F}$ and $G_{4R}$ in the fourth lens group $G_4$. A shape factor which is smaller than the lower limit defined by Condition (8) particularly intensifies the spherical aberration and astigmatism in the positive direction at the telephoto end undesirably. Conversely, a shape factor which is larger than the upper limit defined by Condition (8) undesirably intensifies the astigmatism in the negative direction over the entire zooming range, and undesirably increases changes in the astigmatism and coma caused by zooming.

Condition (9) defines a ratio of an adequate focal length $f_T$ of the entire system at the telephoto end relative to the composite focal length $f_{12}$ of the first and second lens groups $G_1$ and $G_2$. A ratio which is smaller than the lower limit defined by Condition (9) diverges the bundle of rays which has passed through the second lens group $G_2$ when the composite refractive power of the first and second lens groups $G_1$ and $G_2$ is negative, thus necessitating intensification in the refractive power of the third lens group $G_3$, which is undesirable in terms of correction of the aberration. Also, when the refractive power of the second lens group $G_2$ is increased excessively, a factor which is smaller than the lower limit moves the entrance pupil toward the image even if the aperture stop S is disposed in the sixth lens group $G_6$. Consequently, provision of the bundle of rays which forms the lower portion of the principal ray increases the aperture of the first lens group $G_1$, which is undesirable. At that time, AF distance measuring system may be adversely affected and the AF detection accuracy may thus be deteriorated if eclipse exists in the amount of light.

A ratio which is larger than the upper limit defined by Condition (9) intensifies the composite refractive power of the first and second lens groups $G_1$ and $G_2$, thus converging the bundle of rays which has passed through the second lens group $G_2$. Also, when the refractive power of the second lens group $G_2$ is lessened excessively, the movement of the second lens group $G_2$ for focusing is increased, thus hindering auto focusing of the zoom lens. When the refractive power of the first lens group $G_1$ is intensified excessively, the spherical aberration occurs excessively at the telephoto end, thus deteriorating the image forming performance.

To achieve correction of the chromatic aberration to a sufficient extent, not only the first to third lens groups but also the fourth lens group $G_4$ have an achromatic configuration.

At that time, the cemented lens in the first to fourth lens groups has a convex cemented surface at the object side or the air lens formed by the negative and positive lenses in a case where the cemented surface is separated is of meniscus type whose object side surface is convex.

Particularly, it is desirable that the achromatic configuration of the first and fourth lens groups $G_1$ and $G_4$ be constructed of the cemented lens of the positive and negative lenses in the rear subgroups thereof. At that time, the surface refractive power of the cemented surface of the cemented lens in the two groups is made as mild as possible in terms of the image forming performance.

At that time, the following conditions are satisfied:

$$1/1 < |\phi_{1C}/\phi_{1R}| < 1.8 \quad (10)$$

$$0.12 < |\phi_{4C}/\phi_{4R}| < 0.8 \quad (11)$$

where
- $\phi_{1C}$: The surface refractive power of the cemented surface in the rear subgroup $G_{1R}$ of the first lens group $G_1$
- $\phi_{1R}$: The refractive power of the rear subgroup $G_{1R}$ of the first lens group $G_1$
- $\phi_{4C}$: The surface refractive power of the cemented surface in the rear subgroup $G_{4R}$ of the fourth lens group $G_4$
- $\phi_{4R}$: The refractive power of the rear subgroup $G_{4R}$ of the fourth lens group $G_4$.

When Condition (10) is satisfied, correction of the axial and lateral chromatic aberrations at the telephoto end can be balanced excellently, and changes in the axial and lateral chromatic aberrations at the telephoto end, which occur at the infinite and closest focusing distances can be corrected. Also, the astigmatism of the color at the telephoto end can be corrected.

When Condition (11) is satisfied, the lateral chromatic aberration at the wideangle end and the high order of spherical aberration of the color at the telephoto end can be corrected in a well balanced condition. Also, the astigmatism of the wideangle end and the spherical aberration at the telephoto end can be corrected excellently.

In the supertelephoto zoom lens, there are tendencies that the exit pupil is moved away from the image field to the object and that the size of the lens group located closest to the image is hence increased. In order to enlarge the zooming range toward the wideangle end while achieving reduction in the diameter of the lens group located closest to the image field and hence in the overall size thereof, the exit pupil of the lens system is moved toward the image field.

To achieve this, the magnification attained by the fourth lens group $G_4$ having the magnification changing function is increased. At that time, $-1.3 < \beta_{4W} < -0.6$ is satisfied, where $\beta_{4W}$ is the magnification of the fourth lens group $G_4$ at the wideangle end. This results in reduction in the telephoto ratio and movement of the exit pupil further toward the image field, as well as provision of brightness of the edge of image field to a sufficient extent even when the zooming range is enlarged toward the wideangle end.

To effectively move the exit pupil further toward the image, the aperture stop S is provided closer to the image than the fifth lens group $G_5$. At that time, the aperture stop S is disposed in the sixth lens group $G_6$ or between the fifth and sixth lens groups $G_5$ and $G_6$. Particularly, provision of the aperture stop S in the six lens group $G_6$ at a position closer to the image is effective.

Embodiments of the present invention will now be described concretely.

In a first embodiment of the present invention shown in FIG. 1, the first lens group $G_1$ having the positive refractive power includes a positive lens $L_{11}$ having two convex surfaces, a negative meniscus lens $L_{12}$ whose surface located on the object side is convex, and a positive meniscus lens $L_{13}$ whose surface located on the object side is convex. The second lens group $G_2$ having the negative refractive power and the focusing function includes a negative lens $L_{21}$ whose surface located on the image side has a larger radius of curvature, a negative lens $L_{22}$ having two concave surfaces, and a positive lens $L_{23}$ whose surface located on the object side has a larger radius of curvature. The third lens group $G_3$ having the positive refractive power includes a positive lens $L_{31}$ having the two convex surfaces, a negative meniscus lens $L_{32}$ whose surface located on the object side is convex, and a positive lens $L_{33}$ cemented to the negative meniscus lens $L_{32}$ such that the cemented surface thereof located on the object side has a larger radius of curvature. The fourth lens group $G_4$ having the magnification changing function and the negative refractive power includes a negative lens $L_{41}$ whose surface located on the image side has a larger radius of curvature, a negative lens $L_{42}$ having two concave surfaces, and a positive lens $L_{43}$ cemented to the negative lens $L_{42}$ such that the cemented surface thereof located on the object side has a larger radius of curvature. The fifth lens group $G_5$ having the positive refractive power and the image field correction function relative to changes in the magnification includes a positive lens $L_{51}$ whose surface located on the image side has a larger radius of curvature and a negative meniscus lens $L_{52}$ cemented to the positive lens $L_{51}$ such that the surface thereof located on the object side is concave. The sixth lens group $G_6$ having the positive refractive power and the image forming function includes a positive meniscus lens $L_{61}$ whose surface located on the object side is convex, a positive lens $L_{62}$ having two convex surfaces, a negative lens $L_{63}$ having two concave surfaces, and a positive lens $L_{64}$ cemented to the negative lens $L_{63}$ and having two convex surfaces.

Figure 2:
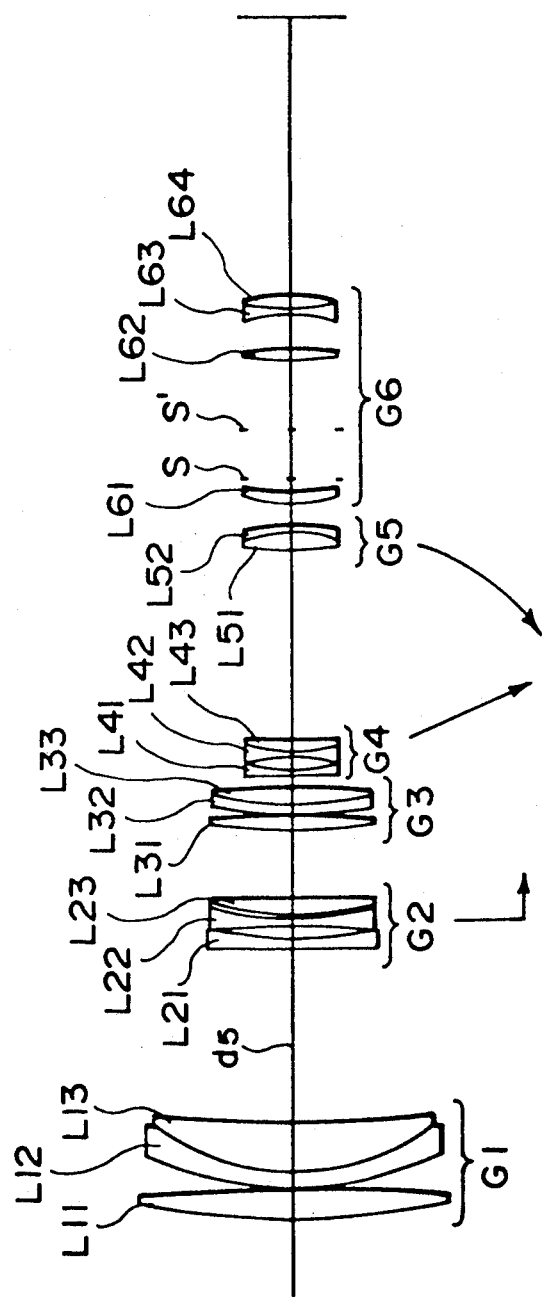
FIG. 2 shows a second embodiment of a lens configuration according to the present invention which is focused to the infinity.
Figure 3:
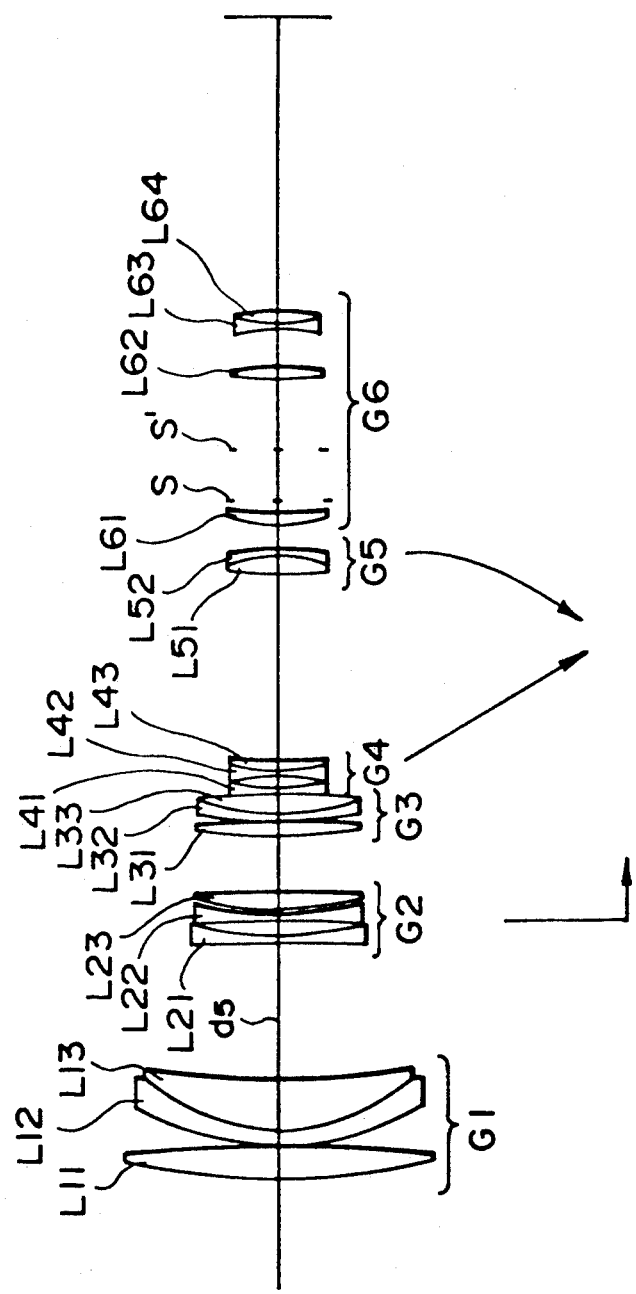
FIG. 3 shows a third embodiment of a lens configuration according to the present invention which is focused to the infinity.
Figure 4:
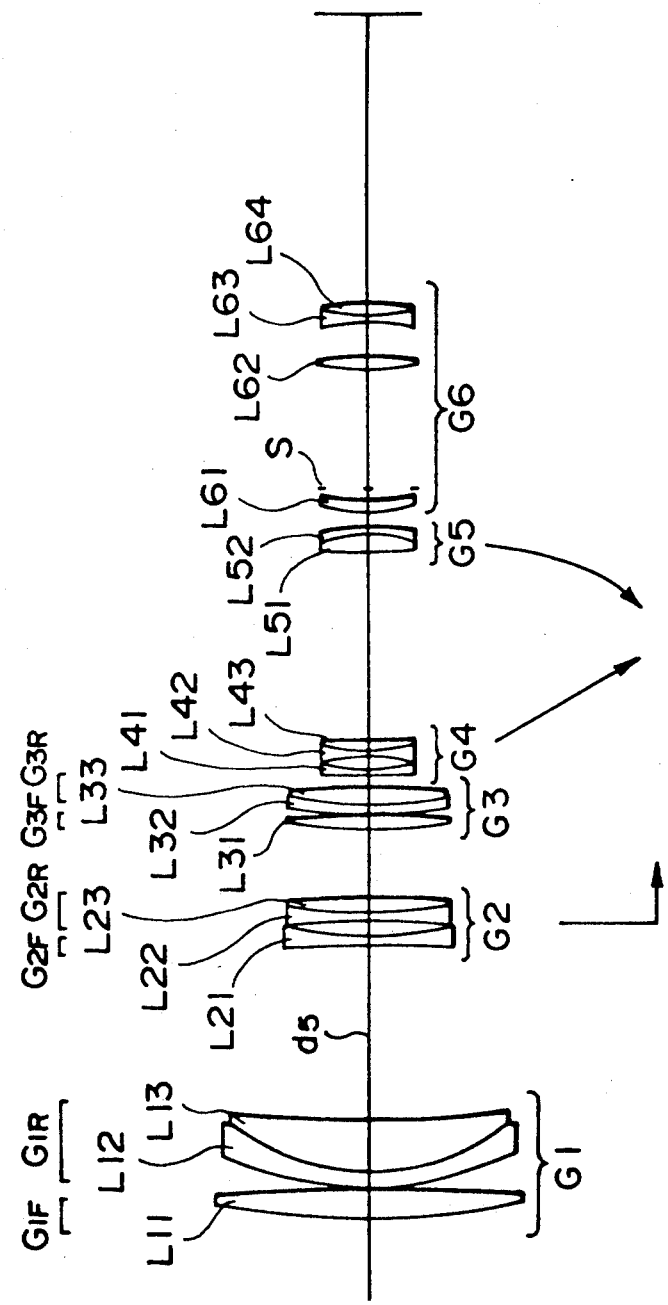
FIG. 4 shows a fourth embodiment of a lens configuration according to the present invention which is focused to the infinity.
Figure 5:
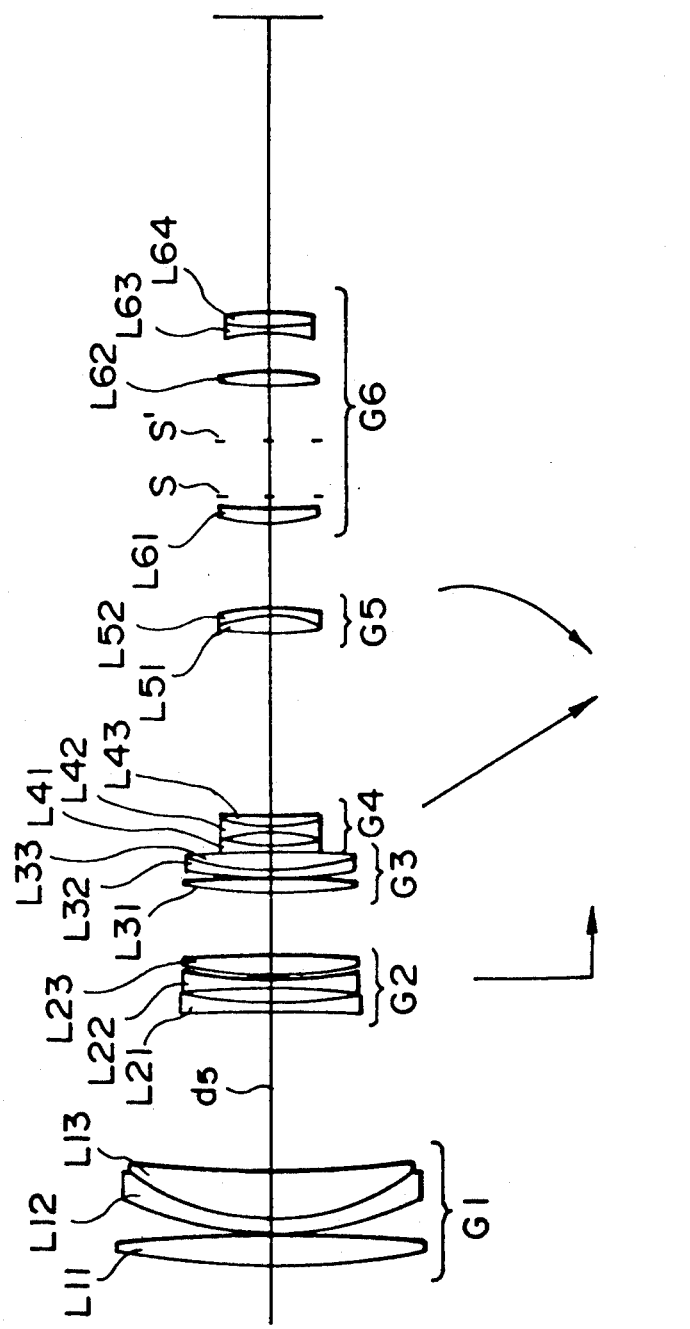
FIG. 5 shows a fifth embodiment of a lens configuration according to the present invention which is focused to the infinity.

As shown in FIGS. 2, 3 and 5, the second, third and fifth embodiments have substantially the same lens configuration as that of the aforementioned first embodiment. The lens configuration of the fourth embodiment differs from those of the first, second, third and fifth embodiments in that the negative lens $L_{22}$ having the two concave surfaces in the second lens group $G_2$ having the focusing function is cemented to the positive lens $L_{23}$ whose surface located on the object side has a larger radius of curvature, as shown in FIG. 4.

Figure 6:
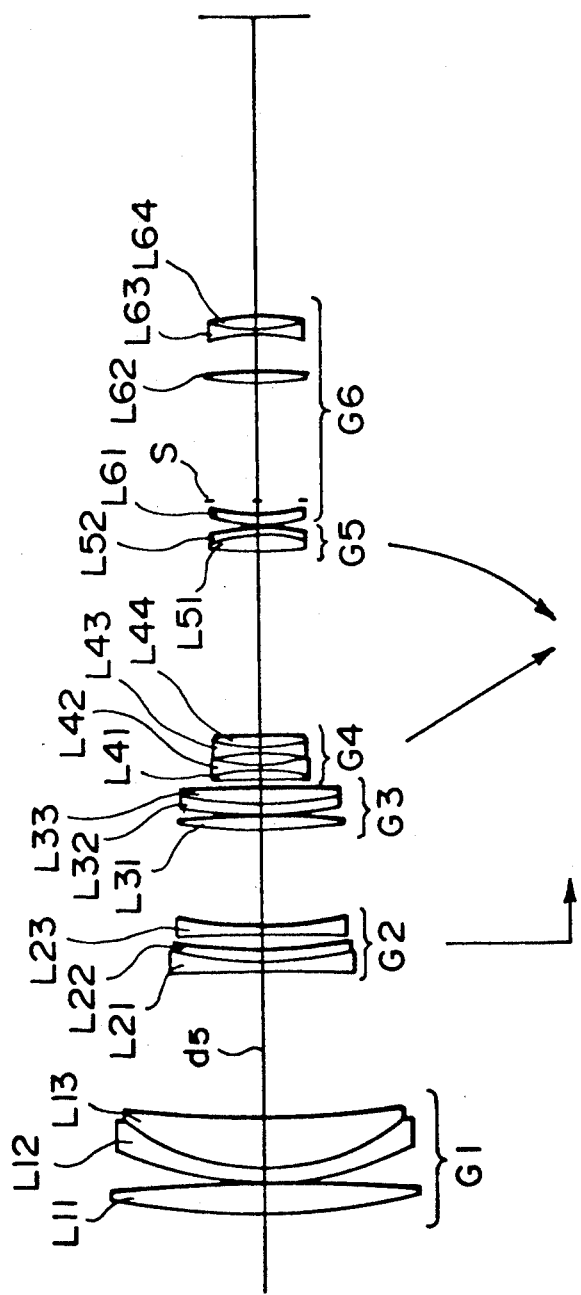
FIG. 6 shows a sixth embodiment of a lens configuration according to the present invention which is focused to the infinity.

The lens configuration of the sixth embodiment differs from those of the first, second, third and fifth embodiments in that the second lens group $G_2$ having the focusing function includes a negative meniscus lens $L_{21}$ whose surface located on the image side has a larger radius of curvature, a positive meniscus lens $L_{22}$ cemented to the negative meniscus lens $L_{21}$ such that the surface thereof located on the object side is convex, and a negative meniscus lens $L_{23}$ whose surface located on the image side has a larger radius of curvature, and in that the fourth embodiment having the magnification changing function includes a positive lens $L_{41}$ having two convex surfaces one of which located on the image side has a larger radius of curvature, a negative lens $L_{42}$ cemented to the positive lens $L_{41}$ and having two concave surfaces, a negative lens $L_{43}$ having two concave surfaces, and a positive meniscus lens $L_{44}$ cemented to the negative lens $L_{43}$ such that the surface thereof located on the object side has a larger radius of curvature, as shown in FIG. 6.

In FIGS. 1 to 6, reference symbols S and S' respectively denote an aperture stop and a fixed aperture. In each embodiment, the aperture stop is disposed between the lenses $L_{61}$ and $L_{62}$ in the sixth lens group $G_6$.

Magnification is changed from the wideangle end to the telephoto end by moving the fourth and fifth lens groups $G_4$ and $G_5$ relative to each other such that the air space between the fourth and fifth lens groups is contracted and then by moving the fourth lens group $G_4$ toward the image in a linear fashion while moving the fifth lens group $G_5$ toward the object in a non-linear fashion. Focusing of the zoom lens to the close focusing distance is conducted by moving the second lens group $G_2$ toward the image in each embodiment. In each embodiment, when the second positive lens $L_{62}$ in the sixth lens group $G_6$ is disposed apart from the negative lens $L_{63}$ and close to the positive lens $L_{61}$ and when the composite refractive power of the second and first lenses $L_{62}$ and $L_{61}$ is intensified, the exit pupil can be further shifted toward the image field while the overall length of the sixth lens group $G_6$ can be reduced. Also, since the focal length of the sixth lens group $G_6$ can be increased, the exit pupil can be shifted toward the image while the telephoto ratio can be reduced.

Furthermore, since each embodiment employs cemented lenses, space and eccentricity tolerances can be enlarged, so as to facilitate manufacture of the zoom lens.

In the achromatic configuration carried out in the first, second, third and fifth embodiments by separating the negative lens $L_{22}$ and the positive lens $L_{23}$ in the rear subgroup $G_{2R}$ of the second lens group $G_2$ from each other, the following condition is satisfied $$0.5 < \phi_{2C}/\phi_2 < 0.9 \tag{12}$$

where $\phi_{2C}$ is the surface refractive power of the image side surface of the negative lens $L_{22}$ located closest to the object in the rear subgroup $G_{2R}$ of the second lens group $G_2$ while $\phi_2$ is the refractive power of the second lens group $G_2$.

Condition (12) defines an adequate surface refractive power of the image side surface of the negative lens located closest to the object in the rear subgroup $G_{2R}$ of the second lens group, which is required to make mild the lateral chromatic aberration curve at the closest focusing distance and at the wideangle end. A ratio which is larger than the upper limit defined by Condition (12) intensifies the spherical aberration in the positive direction at the telephoto end, which is undesirable because correction of this spherical aberration by the other lenses leaves an intensified annular spherical aberration. Conversely, a ratio which is smaller than the lower limit defined by Condition (12) lessens the surface refractive power of the image side surface of the negative lens disposed closest to the object in the rear subgroup $G_{2R}$ of the second lens group. Consequently, the other lens surfaces must carry the load of the required negative refractive power, and this intensifies the spherical aberration in the negative direction at the telephoto end.

Tables 1 to 6 list values of the items of the respective embodiments. The digits on the left of each Table represent the order of the lens surfaces with the surface closest to the object being number one, r represents the radius of curvature of the lens surface, d represents the interval between the lens surfaces, n represents the index of refraction, v represents the Abbe number, n and v being the values relative to the d line ($\lambda = 587.6$ nm), f represents the focal distance of the overall system, Bf represents the back focus, $\beta$ represents the image magnification, and D0 represents the distance from the object side surface (the first surface) of the lens closest to the front and the object. Table 7 lists the numerals corresponding to the conditions.

TABLE 1

(First Embodiment)

Angle of view: 12.4° to 4.0°  F number: 5.6

| | r | d | v | n | | |
|---|---|---|---|---|---|---|
| 1 | 282.706 | 12.00 | 82.6 | 1.49782 | $G_{1F}$ ⎤ | |
| 2 | −892.613 | 0.50 | | | ⎬ | $G_1$ |
| 3 | 130.000 | 5.60 | 31.7 | 1.75692 ⎤ | | |
| 4 | 89.000 | 20.00 | 82.6 | 1.49782 ⎦ | $G_{1R}$ ⎦ | |
| 5 | 407.679 | (d5) | | | | |
| 6 | −1248.466 | 3.50 | 54.0 | 1.71300 | $G_{2F}$ ⎤ | |
| 7 | 141.163 | 5.50 | | | ⎬ | $G_2$ |
| 8 | −626.031 | 3.50 | 49.5 | 1.74443 ⎤ | | |
| 9 | 153.034 | 1.50 | | | $G_{2R}$ ⎦ | |
| 10 | 148.647 | 6.70 | 31.1 | 1.68893 ⎦ | | |
| 11 | −986.249 | (d11) | | | | |
| 12 | 234.078 | 5.50 | 60.3 | 1.62041 | $G_{3F}$ ⎤ | |
| 13 | −708.172 | 0.20 | | | ⎬ | $G_3$ |
| 14 | 181.038 | 3.10 | 31.7 | 1.75692 ⎤ | | |
| 15 | 108.000 | 7.70 | 70.1 | 1.51860 ⎦ | $G_{3R}$ ⎦ | |
| 16 | −457.625 | (d16) | | | | |
| 17 | 7497.915 | 2.10 | 58.5 | 1.65160 | $G_{4F}$ ⎤ | |
| 18 | 66.642 | 5.00 | | | ⎬ | $G_4$ |
| 19 | −73.353 | 2.30 | 54.0 | 1.71300 ⎤ | | |
| 20 | 69.000 | 4.00 | 23.0 | 1.86074 ⎦ | $G_{4R}$ ⎦ | |
| 21 | 520.648 | (d21) | | | | |
| 22 | 195.649 | 7.20 | 58.6 | 1.61272 | ⎤ | |
| 23 | −49.500 | 2.40 | 31.7 | 1.75692 | ⎦ | $G_5$ |
| 24 | −124.538 | (d24) | | | | |
| 25 | 69.300 | 4.60 | 82.6 | 1.49782 | $G_{6F}$ ⎤ | |
| 26 | 131.261 | 52.40 | | | ⎬ | $G_6$ |
| 27 | 118.000 | 4.70 | 53.6 | 1.54739 ⎤ | | |
| 28 | −135.500 | 14.80 | | | | |
| 29 | −63.000 | 2.30 | 45.4 | 1.79668 | $G_{6R}$ ⎦ | |
| 30 | 95.000 | 5.20 | 56.5 | 1.50137 ⎦ | | |
| 31 | −78.644 | (Bf) | | | | |

| Infinite focusing distance | | | |
|---|---|---|---|
| f | 200.000 | 399.999 | 599.998 |
| D0 | ∞ | ∞ | ∞ |
| d5 | 67.792 | 67.792 | 67.792 |
| d11 | 25.445 | 25.445 | 25.445 |
| d16 | 5.080 | 39.968 | 51.314 |
| d21 | 75.088 | 37.238 | 0.698 |
| d24 | 3.209 | 6.172 | 31.365 |
| Bf | 116.226 | 116.226 | 116.226 |

| Close focusing distance (when the distance R between the close object to the image field is 3083) | | | |
|---|---|---|---|
| f | 200.000 | 399.999 | 599.998 |
| $\beta$ | −0.083 | −0.167 | −0.250 |
| D0 | 2607.746 | 2607.747 | 2607.747 |
| d5 | 92.362 | 92.362 | 92.362 |
| d11 | 0.875 | 0.875 | 0.875 |
| d16 | 5.080 | 39.968 | 51.314 |
| d21 | 75.088 | 37.238 | 0.698 |
| d24 | 3.209 | 6.172 | 31.365 |

TABLE 1-continued
(First Embodiment)

| | | | |
|---|---|---|---|
| Bf | 116.226 | 116.226 | 116.226 |

TABLE 2
(Second Embodiment)

Angle of view: 12.4° to 4.0°  F number: 5.6

| | r | d | ν | n | | |
|---|---|---|---|---|---|---|
| 1 | 308.948 | 12.00 | 82.6 | 1.49782 | G$_{1F}$ | |
| 2 | −789.723 | 0.50 | | | | G$_1$ |
| 3 | 138.132 | 5.60 | 31.7 | 1.75692 | G$_{1R}$ | |
| 4 | 94.277 | 20.00 | 82.6 | 1.49782 | | |
| 5 | 538.815 | (d5) | | | | |
| 6 | −2329.747 | 3.50 | 54.0 | 1.71300 | G$_{2F}$ | |
| 7 | 163.185 | 5.00 | | | | G$_2$ |
| 8 | −400.119 | 3.50 | 49.5 | 1.74443 | G$_{2R}$ | |
| 9 | 142.864 | 1.50 | | | | |
| 10 | 147.991 | 6.70 | 31.1 | 1.68893 | | |
| 11 | −903.769 | (d11) | | | | |
| 12 | 234.078 | 5.50 | 60.3 | 1.62041 | G$_{3F}$ | |
| 13 | −708.172 | 0.20 | | | | G$_3$ |
| 14 | 186.225 | 3.60 | 27.6 | 1.75520 | G$_{3R}$ | |
| 15 | 125.500 | 7.20 | 82.6 | 1.49782 | | |
| 16 | −452.333 | (d16) | | | | |
| 17 | 7497.915 | 2.10 | 58.5 | 1.65160 | G$_{4F}$ | |
| 18 | 70.701 | 5.00 | | | | G$_4$ |
| 19 | −75.634 | 2.30 | 54.0 | 1.71300 | G$_{4R}$ | |
| 20 | 65.000 | 4.00 | 23.0 | 1.86074 | | |
| 21 | 332.191 | (d21) | | | | |
| 22 | 182.524 | 7.20 | 58.6 | 1.61272 | | |
| 23 | −50.200 | 2.40 | 31.7 | 1.75692 | | G$_5$ |
| 24 | −130.192 | (d24) | | | | |
| 25 | 67.354 | 4.60 | 82.6 | 1.49782 | G$_{6F}$ | |
| 26 | 130.346 | 52.40 | | | | |
| 27 | 120.000 | 4.70 | 53.6 | 1.54739 | | G$_6$ |
| 28 | −132.300 | 14.80 | | | | |
| 29 | −59.600 | 1.80 | 45.4 | 1.79668 | G$_{6R}$ | |
| 30 | 100.000 | 5.50 | 54.6 | 1.51454 | | |
| 31 | −79.756 | (Bf) | | | | |

Infinite focusing distance

| f | 200.000 | 399.999 | 599.998 |
|---|---|---|---|
| D0 | ∞ | ∞ | ∞ |
| d 5 | 68.438 | 68.438 | 68.438 |
| d11 | 26.857 | 26.857 | 26.857 |
| d16 | 4.685 | 39.573 | 50.919 |
| d21 | 75.626 | 37.776 | 1.236 |
| d24 | 9.082 | 12.045 | 37.238 |
| Bf | 113.560 | 113.560 | 113.560 |

Close focusing distance (when the distance R between the close object to the image field is 3001)

| f | 200.000 | 399.999 | 599.998 |
|---|---|---|---|
| β | −0.086 | −0.173 | −0.259 |
| D0 | 2521.122 | 2521.123 | 2521.123 |
| d 5 | 93.923 | 93.923 | 93.923 |
| d11 | 1.371 | 1.371 | 1.371 |
| d16 | 4.685 | 39.573 | 50.919 |
| d21 | 75.626 | 37.776 | 1.236 |
| d24 | 9.082 | 12.045 | 37.238 |
| Bf | 113.560 | 113.560 | 113.560 |

TABLE 3
(Third Embodiment)

Angle of view: 12.4° to 4.0°  F number: 5.6

| | r | d | ν | n | | |
|---|---|---|---|---|---|---|
| 1 | 250.282 | 13.50 | 82.6 | 1.49782 | G$_{1F}$ | |
| 2 | −665.781 | 0.40 | | | | G$_1$ |
| 3 | 112.729 | 5.50 | 31.7 | 1.75692 | G$_{1R}$ | |
| 4 | 77.500 | 20.00 | 82.6 | 1.49782 | | |
| 5 | 306.318 | (d5) | | | | |
| 6 | −1239.253 | 3.10 | 54.0 | 1.71300 | G$_{2F}$ | |
| 7 | 126.042 | 5.90 | | | | G$_2$ |
| 8 | −560.767 | 3.10 | 49.5 | 1.74443 | G$_{2R}$ | |
| 9 | 137.077 | 1.35 | | | | |
| 10 | 129.944 | 6.50 | 31.1 | 1.68893 | | |
| 11 | −1115.385 | (d11) | | | | |
| 12 | 243.331 | 5.00 | 60.3 | 1.62041 | G$_{3F}$ | |
| 13 | −713.457 | 0.20 | | | | G$_3$ |
| 14 | 182.229 | 3.10 | 35.2 | 1.74950 | G$_{3R}$ | |
| 15 | 104.000 | 7.70 | 70.1 | 1.51860 | | |
| 16 | −405.171 | (d16) | | | | |
| 17 | 7425.119 | 2.10 | 60.0 | 1.64000 | G$_{4F}$ | |
| 18 | 69.010 | 4.95 | | | | G$_4$ |
| 19 | −76.181 | 2.10 | 54.0 | 1.71300 | G$_{4R}$ | |
| 20 | 64.000 | 4.00 | 23.0 | 1.86074 | | |
| 21 | 306.154 | (d21) | | | | |
| 22 | 203.300 | 7.20 | 60.3 | 1.62041 | | |
| 23 | −49.500 | 2.40 | 31.7 | 1.75692 | | G$_5$ |
| 24 | −126.094 | (d24) | | | | |
| 25 | 68.850 | 4.70 | 70.1 | 1.51860 | G$_{6F}$ | |
| 26 | 132.997 | 53.50 | | | | |
| 27 | 120.513 | 4.80 | 53.6 | 1.54739 | | G$_6$ |
| 28 | −138.869 | 15.10 | | | | |
| 29 | −62.782 | 2.30 | 45.4 | 1.79668 | G$_{6R}$ | |
| 30 | 96.998 | 5.00 | 54.6 | 1.51454 | | |
| 31 | −88.457 | (Bf) | | | | |

Infinite focusing distance

| f | 200.000 | 400.000 | 600.000 |
|---|---|---|---|
| D0 | ∞ | ∞ | ∞ |
| d 5 | 54.725 | 54.725 | 54.725 |
| d11 | 22.093 | 23.093 | 23.093 |
| d16 | .324 | 37.128 | 49.173 |
| d21 | 74.459 | 39.072 | 4.518 |
| d24 | 9.465 | 8.048 | 30.556 |
| Bf | 119.640 | 119.640 | 119.640 |

Close focusing distance (when the distance R between the close object to the image field is 2995)

| f | 200.000 | 400.000 | 600.000 |
|---|---|---|---|
| β | −0.085 | −0.170 | −0.256 |
| D0 | 2530.154 | 2530.154 | 2530.154 |
| d 5 | 74.355 | 74.355 | 74.355 |
| d11 | 3.463 | 3.463 | 3.463 |
| d16 | 0.324 | 37.128 | 49.173 |
| d21 | 74.459 | 39.072 | 4.518 |
| d24 | 9.465 | 8.048 | 30.556 |
| Bf | 119.640 | 119.640 | 119.640 |

TABLE 4
(Fourth Embodiment)

Angle of view: 12.4° to 4.0°  F number: 5.6

| | r | d | ν | n | | |
|---|---|---|---|---|---|---|
| 1 | 306.274 | 12.00 | 82.6 | 1.49782 | G$_{1F}$ | |
| 2 | −856.901 | 0.50 | | | | G$_1$ |
| 3 | 139.117 | 5.60 | 31.7 | 1.75692 | G$_{1R}$ | |
| 4 | 94.500 | 20.00 | 82.6 | 1.49782 | | |
| 5 | 587.538 | (d5) | | | | |
| 6 | −906.010 | 3.50 | 50.3 | 1.72000 | G$_{2F}$ | |
| 7 | 154.841 | 6.00 | | | | G$_2$ |
| 8 | −406.520 | 3.50 | 49.5 | 1.74443 | G$_{2R}$ | |
| 9 | 190.000 | 6.00 | 31.1 | 1.68893 | | |
| 10 | −528.609 | (d10) | | | | |
| 11 | 234.078 | 5.50 | 57.0 | 1.62280 | G$_{3F}$ | |
| 12 | −719.345 | 0.20 | | | | G$_3$ |
| 13 | 215.355 | 3.60 | 27.6 | 1.75520 | G$_{3R}$ | |
| 14 | 145.000 | 7.20 | 70.1 | 1.51860 | | |
| 15 | −417.630 | (d15) | | | | |
| 16 | 7497.915 | 2.10 | 57.6 | 1.67025 | G$_{4F}$ | |
| 17 | 71.432 | 5.00 | | | | G$_4$ |
| 18 | −75.818 | 2.30 | 54.0 | 1.71300 | | |

TABLE 4-continued (Fourth Embodiment)

| | | | | |
|---|---|---|---|---|
| 19 | 65.000 | 4.00 | 23.0 | 1.86074 | $G_{4R}$
| 20 | 350.389 | (d20) | | |
| 21 | 147.921 | 7.20 | 70.2 | 1.48749 | $G_5$
| 22 | −48.000 | 2.40 | 31.1 | 1.68893 |
| 23 | −95.814 | (d23) | | |
| 24 | 64.700 | 4.60 | 59.0 | 1.51823 | $G_{6F}$
| 25 | 107.229 | 52.40 | | | $G_6$
| 26 | 120.000 | 4.70 | 57.0 | 1.62280 |
| 27 | −158.000 | 14.80 | | |
| 28 | −65.700 | 1.80 | 45.4 | 1.79668 | $G_{6R}$
| 29 | 63.000 | 5.50 | 54.0 | 1.61720 |
| 30 | −117.108 | (Bf) | | |

Infinite focusing distance

| f | 200.000 | 399.999 | 599.998 |
|---|---|---|---|
| D0 | ∞ | ∞ | ∞ |
| d 5 | 68.558 | 68.558 | 68.558 |
| d10 | 27.720 | 27.720 | 27.720 |
| d15 | 5.085 | 39.972 | 51.319 |
| d20 | 74.959 | 37.109 | 0.569 |
| d23 | 5.954 | 8.916 | 34.109 |
| Bf | 116.495 | 116.494 | 116.494 |

Close focusing distance (when the distance R between the close object to the image field is 3000)

| f | 200.000 | 399.999 | 599.998 |
|---|---|---|---|
| β | −0.086 | −0.173 | −0.259 |
| D0 | 2520.829 | 2520.830 | 2520.830 |
| d 5 | 94.043 | 94.043 | 94.043 |
| d10 | 2.235 | 2.235 | 2.235 |
| d15 | 5.085 | 39.972 | 51.319 |
| d20 | 74.959 | 37.109 | 0.569 |
| d23 | 5.954 | 8.916 | 34.109 |
| Bf | 116.495 | 116.494 | 116.494 |

TABLE 5

(Fifth Embodiment)

Angle of view: 12.4° to 4.0° F number: 5.6

| | r | d | ν | n | |
|---|---|---|---|---|---|
| 1 | 321.821 | 12.00 | 82.6 | 1.49782 | $G_{1F}$
| 2 | −729.411 | 0.20 | | | $G_1$
| 3 | 136.902 | 5.80 | 31.7 | 1.75692 |
| | | | | | $G_{1R}$
| 4 | 93.500 | 19.00 | 82.6 | 1.49782 |
| 5 | 441.164 | (d5) | | |
| 6 | −2227.832 | 3.90 | 54.0 | 1.71300 | $G_{2F}$
| 7 | 173.140 | 5.70 | | | $G_2$
| 8 | −455.080 | 3.90 | 49.5 | 1.74443 |
| 9 | 157.808 | 1.70 | | | $G_{2R}$
| 10 | 168.319 | 7.60 | 31.1 | 1.68893 |
| 11 | −626.652 | (d11) | | |
| 12 | 211.907 | 5.20 | 60.3 | 1.62041 | $G_{3F}$
| 13 | −736.731 | 0.20 | | | $G_3$
| 14 | 196.394 | 3.20 | 27.6 | 1.75520 |
| | | | | | $G_{3R}$
| 15 | 124.000 | 7.20 | 82.6 | 1.49782 |
| 16 | −600.710 | (d16) | | |
| 17 | 7570.710 | 2.00 | 58.5 | 1.65160 | $G_{4F}$
| 18 | 68.030 | 5.50 | | | $G_4$
| 19 | −76.369 | 2.30 | 54.0 | 1.71300 |
| | | | | | $G_{4R}$
| 20 | 65.631 | 4.00 | 23.0 | 1.86074 |
| 21 | 409.227 | (d21) | | |
| 22 | 176.858 | 6.90 | 57.0 | 1.62280 | $G_5$
| 23 | −48.000 | 2.30 | 31.7 | 1.75692 |
| 24 | −131.074 | (d24) | | |
| 25 | 72.169 | 5.00 | 82.6 | 1.49782 | $G_{6F}$
| 26 | 142.978 | 49.00 | | | $G_6$
| 27 | 123.125 | 5.10 | 53.6 | 1.54739 |
| 28 | −116.000 | 16.30 | | |
| 29 | −60.000 | 2.00 | 45.4 | 1.79668 | $G_{6R}$
| 30 | 109.778 | 6.00 | 60.3 | 1.51835 |
| 31 | −108.343 | (Bf) | | |

TABLE 5-continued (Fifth Embodiment)

Infinite focusing distance

| f | 200.000 | 400.000 | 600.000 |
|---|---|---|---|
| D0 | ∞ | ∞ | ∞ |
| d 5 | 63.989 | 63.989 | 63.989 |
| d11 | 25.782 | 25.782 | 25.782 |
| d16 | 0.250 | 38.473 | 50.858 |
| d21 | 72.139 | 36.625 | 2.290 |
| d24 | 34.246 | 31.537 | 53.487 |
| Bf | 119.861 | 119.861 | 119.861 |

Close focusing distance (when the distance R between the close object to the image field is 3301)

| f | 200.000 | 400.000 | 600.000 |
|---|---|---|---|
| β | −0.077 | −0.154 | −0.231 |
| D0 | 2802.624 | 2802.624 | 2802.624 |
| d 5 | 88.861 | 88.861 | 88.861 |
| d11 | 0.910 | 0.910 | 0.910 |
| d16 | 0.250 | 38.473 | 50.858 |
| d21 | 72.139 | 36.625 | 2.290 |
| d24 | 34.246 | 31.537 | 53.487 |
| Bf | 119.861 | 119.861 | 119.862 |

TABLE 6

(Sixth Embodiment)

Angle of view: 12.4° to 4.0° F number: 5.6

| | r | d | ν | n | |
|---|---|---|---|---|---|
| 1 | 290.868 | 12.00 | 82.6 | 1.49782 | $G_{1F}$
| 2 | −774.673 | 0.50 | | | $G_1$
| 3 | 135.585 | 5.60 | 31.7 | 1.75692 |
| | | | | | $G_{1R}$
| 4 | 92.000 | 20.00 | 82.6 | 1.49782 |
| 5 | 455.551 | (d5) | | |
| 6 | −11562.773 | 3.50 | 64.1 | 1.51680 | $G_{2F}$
| 7 | 135.000 | 6.00 | 29.5 | 1.71736 | $G_2$
| 8 | 206.390 | 5.00 | | | $G_{2R}$
| 9 | −1945.925 | 3.50 | 60.7 | 1.60311 |
| 10 | 155.393 | (d10) | | |
| 11 | 220.000 | 5.50 | 64.1 | 1.51680 | $G_{3F}$
| 12 | −336.868 | 0.20 | | | $G_3$
| 13 | 190.649 | 3.60 | 25.5 | 1.80458 |
| | | | | | $G_{3R}$
| 14 | 138.000 | 7.20 | 64.1 | 1.51680 |
| 15 | −841.391 | (d15) | | |
| 16 | 965.857 | 3.50 | 27.6 | 1.75520 | $G_{4F}$
| 17 | −115.000 | 2.00 | 47.1 | 1.67003 | $G_4$
| 18 | 63.514 | 5.00 | | |
| 19 | −66.729 | 2.30 | 45.1 | 1.74400 | $G_{4R}$
| 20 | 74.000 | 4.00 | 23.0 | 1.86074 |
| 21 | 1917.110 | (d21) | | |
| 22 | 145.000 | 7.20 | 70.2 | 1.48749 | $G_5$
| 23 | −50.000 | 2.40 | 31.7 | 1.75692 |
| 24 | −91.173 | (d24) | | |
| 25 | 63.000 | 4.60 | 82.6 | 1.49782 | $G_{6F}$
| 26 | 101.589 | 52.40 | | | $G_6$
| 27 | 117.000 | 4.70 | 59.6 | 1.60729 |
| 28 | −169.393 | 14.80 | | |
| 29 | −67.051 | 1.80 | 39.6 | 1.80454 | $G_{6R}$
| 30 | 61.641 | 5.50 | 39.2 | 1.62606 |
| 31 | −104.489 | (Bf) | | |

Infinite focusing distance

| f | 200.000 | 399.999 | 599.998 |
|---|---|---|---|
| D0 | ∞ | ∞ | ∞ |
| d 5 | 57.607 | 57.607 | 57.607 |
| d10 | 38.752 | 38.752 | 38.752 |
| d15 | 2.561 | 37.449 | 48.795 |
| d21 | 74.751 | 36.901 | 0.361 |
| d24 | 1.437 | 4.400 | 29.593 |
| Bf | 120.170 | 120.170 | 120.170 |

Close focusing distance (when the distance R between the close object to the image field is 3004)

| f | 200.000 | 399.999 | 599.998 |
|---|---|---|---|

TABLE 6-continued (Sixth Embodiment)

| $\beta$ | −0.086 | −0.172 | −0.259 |
|---|---|---|---|
| D0 | 2526.102 | 2526.102 | 2526.102 |
| d 5 | 83.070 | 83.070 | 83.070 |

TABLE 7

(Numerical List Corresponding to Conditions)

| | Embodiment | | | | | |
|---|---|---|---|---|---|---|
| | 1 | 2 | 3 | 4 | 5 | 6 |
| $|f_2|/f_{123}$ | 0.6809 | 0.6809 | 0.6196 | 0.6809 | 0.8006 | 0.6809 |
| $\nu_{1p} - \nu_{1n}$ | 50.9 | 50.9 | 50.9 | 50.9 | 50.9 | 50.9 |
| $\nu_{2n} - \nu_{2p}$ | 20.65 | 20.65 | 20.65 | 18.8 | 20.65 | 32.9 |
| $f_{1F}/f_{1R}$ | 0.7855 | 0.8533 | 0.7069 | 0.8462 | 0.7838 | 0.7607 |
| $f_{2F}/f_{2R}$ | 0.1185 | 0.3395 | 0.1251 | 0.1479 | 0.2458 | 2.0787 |
| $\dfrac{rb + ra}{rb - ra}$ | 0.519 | 0.438 | 0.454 | 0.473 | 0.388 | 0.454 |
| $\dfrac{rd + rc}{rd - rc}$ | 4.4306 | 2.5889 | 3.0222 | 7.6590 | 6.3048 | −0.852 |
| $\dfrac{rf + re}{rf - re}$ | −0.031 | 0.034 | 0.049 | 0.030 | 0.058 | 0.025 |
| $f_T/f_{12}$ | 0.2344 | 0.2344 | 0.2800 | 0.2344 | 0.2899 | 0.2344 |
| $|\phi_{1C}/\phi_{1R}|$ | 1.599 | 1.439 | 1.730 | 1.405 | 1.592 | 1.584 |
| $|\phi_{4C}/\phi_{4R}|$ | 0.231 | 0.232 | 0.233 | 0.236 | 0.237 | 0.158 |
| $\phi_{2C}/\phi_2$ | 0.778 | 0.834 | 0.778 | | 0.859 | |

As will be understood from the lens data on the respective embodiments shown in Tables 1 to 6 and the lens configurations of the respective embodiments, the second lens group $G_2$ serving as the focusing group has a small diameter and the overall length and the lens shape are compact, although a high zooming ratio of three times and a super telephoto configuration of 600 are achieved.

In the first, second, third and fifth embodiments, since the second lens group $G_2$ has an achromatic configuration in which the cemented lenses are separated, the degree of freedom for the correction of aberration can be increased, and higher orders of various aberrations can thus be corrected effectively. Particularly, since Condition (1) is satisfied, the lateral chromatic aberration curve at the wideangle end and at the close focusing distance is small.

In each embodiment, since the cemented surface of the cemented lens in the rear subgroup $G_{4R}$ of the fourth lens group $G_4$ has a small radius of curvature, high-order chromatic astigmatism at the wideangle side and high-order chromatic spherical aberration at the telephoto side are generated less.

In each embodiment, aberration is corrected effectively and excellent image forming performance is thus attained in the overall zooming range from the wideangle end to the telephoto end at a focusing distance ranging from the infinity to the very close distance,

What is claimed is:

1. An inner focusing type telephoto zoom lens, comprising:
a fixed first lens group having a positive refractive power, the first lens group being disposed closest to the object; a second lens group having a negative refractive power, the second lens group being movable along an optical axis for focusing; a fixed third lens group having a positive refractive power; a fourth lens group having a negative refractive power, the fourth lens group being movable along the optical axis for zooming; a fifth lens group having a positive refractive power, the fifth lens group being movable along the optical axis relative to the fourth lens group; and a fixed sixth lens group having a positive refractive power, said zoom lens satisfying the following condition:

$$0.4 < |f_2|/f_{123} < 0.9$$

where $f_{123}$ is a composite focal length of said first, second and third lens groups, and $f_2$ indicates a focal length of the second lens group.

2. The inner focusing type telephoto zoom lens according to claim 1, wherein said first, second and third lens groups respectively comprise a plurality of lenses including a positive lens and a negative lens for correcting a chromatic aberration, said first lens group satisfying the following condition:

$$40 < \nu_{1p} - \nu_{1N} < 70$$

where $\nu_{1p}$ is an average Abbe number of said positive lens and $V_{1n}$ is an average Abbe number of said negative lens.

3. The inner focusing type telephoto zoom lens according to claim 1, wherein said first, second and third lens groups respectively comprise a plurality of lenses including a positive lens and a negative lens for correcting a chromatic aberration, at least one positive and negative lens pair in said first, second and third lens groups being constructed by cementing the positive and negative lenses such that they have a cemented convex surface on the object side.

4. The inner focusing type telephoto zoom lens according to claim 3, wherein said second lens group comprises the plurality of lenses including one negative and positive lens pair which is formed by cementing the negative and positive lenses such that they have the convex cemented surface on the object side, and satisfies the following condition:

$$10 < \nu_{2n} - \nu_{2p} < 40$$

where $\nu_{2p}$ is an average Abbe number of the positive lens, and $\nu_{2n}$ is an average Abbe number of the negative lens.

5. The inner focusing type telephoto zoom lens according to claim 3, wherein said first and second lens groups respectively comprise the plurality of lenses, including one negative and positive lens pair which is formed by cementing the negative and positive lenses such that they have a convex cemented surface on the object side, and satisfy the following conditions:

$$40 < \nu_{1p} - \nu_{1n} < 70$$

and $$10 < \nu_{2n} - \nu_{2p} < 40$$

where $\nu_{1p}$ is an average Abbe number of said positive lens in said first lens group, $\nu_{1n}$ is an average Abbe number of said negative lens in said first lens group, $\nu_{2p}$ is an average Abbe number of said positive lens in said second lens group, and $\nu_{2n}$ is an average Abbe number of the negative lens in said second lens group.

6. The inner focusing type telephoto zoom lens according to claim 1, wherein said first, second and third lens groups respectively comprise a plurality of lenses including a positive lens and a negative lens for correcting a chromatic aberration, at least one positive and negative lens pair in said first, second and third lens groups being constructed by separating the positive and negative lenses such that they have a meniscus air lens whose surface located on the object side is convex.

7. The inner focusing type telephoto zoom lens according to claim 6, wherein said second lens group comprises the plurality of lenses including one negative and positive lens pair which is formed by separating the negative and positive lenses such that they have the meniscus air lens whose surface located on the object side is convex, and satisfies the following condition:

$$10 < \nu_{2n} - \nu_{2p} < 40$$

where $\nu_{2p}$ is an average Abbe number of the positive lens, and $\nu_{2n}$ is an average Abbe number of the negative lens.

8. The inner focusing type telephoto zoom lens according to claim 6, wherein said second lens group comprises a front subgroup including a negative lens whose surface located on the image side has a larger radius of curvature, and a rear subgroup including a negative lens having two concave surfaces and a positive lens whose surface located on the object side has a larger radius of curvature, said negative lens having the two concave surfaces and said positive lens in said rear subgroup being separated such that they form the meniscus air lens whose surface located on the object side is convex, said second lens group satisfying the following condition:

$$0.5 < \Phi_{2C}/\phi_2 < 0.9$$

where $\phi_2$ is the refractive power of said second lens group and $\phi_{2C}$ is the surface refractive power of an image side surface of said negative lens having the two concave surfaces.

9. The inner focusing type telephoto zoom lens according to claim 1, wherein said first lens group comprises a front subgroup having a positive refractive power and a rear subgroup having a positive refractive power while said second and fourth lens groups respective include a front subgroup having a negative refractive power and a rear subgroup having a negative refractive power, said first, second and fourth lens groups satisfying the following conditions:

$$0.3 < f_{1F}/f_{1R} < 1.0, \ 0.1 < f_{2F}/f_{2R} < 7$$

$$0.3 < \frac{rb + ra}{rb - ra} < 0.6, \ -1 < \frac{rd + rc}{rd - rc} < 8$$

$$-0.2 < \frac{rf + re}{rf - re} < 0.2, \ 0.01 < f_T/f_{12} < 0.3$$

where
$f_{1F}$: a focal length of said front subgroup in said first lens group
$f_{1R}$: a focal length of said rear subgroup in said first lens group
$f_{2F}$: a focal length of said front subgroup in said second lens group
$f_{2R}$: a focal length of said rear subgroup in said second lens group
$r_a$: a radius of curvature of a surface disposed closest to the object in said front subgroup of said first lens group
$r_b$: a radius of curvature of a surface disposed closest to the image field in said front subgroup of said first lens group
$r_c$: a radius of curvature of a surface disposed closest to the object in said rear subgroup of said second lens group
$r_d$: a radius of curvature of a surface disposed closest to the image field in said rear subgroup of said second lens group
$r_e$: a radius of curvature of a surface disposed closest to the object in an air lens formed between said front and rear subgroups of said fourth lens group
$r_f$: a radius of curvature of a surface disposed closest to the image field in said air lens formed between said front and rear subgroups of said fourth lens group
$f_{12}$: a composite focal length of said first and second lens groups
$f_T$: a focal distance of the zoom lens at the telephoto end.

10. The inner focusing type telephoto zoom lens according to claim 1, wherein said first, second, third and fourth lens groups respectively comprise a front subgroup and a rear subgroup, either of which comprises a cemented lens including at least one pair of positive lens and negative lens which are cemented to each other for correcting a chromatic aberration, said cemented lens having a cemented convex surface on the object side.

11. The inner focusing type telephoto zoom lens according to claim 10, wherein the rear subgroup of each of said first and fourth lens groups comprises a cemented lens including one pair of positive lens and negative lens, said first and fourth lens groups satisfying the following conditions:

$$1.1 < |\phi_{1C}/\phi_{1R}| < 1.8$$

$$0.12 < |\phi_{4C}/\phi_{4R}| < 0.3$$

where 100 $_{1R}$ is the refractive power of said rear subgroup of said first lens group, $\phi_{1C}$ is the surface refractive power of the cemented surface in said rear subgroup of said first lens group, $\phi_{4R}$ is the refractive power of said rear subgroup of said fourth lens group, and $\phi_{4C}$ is the surface refractive power of the cemented surface in said rear subgroup of said fourth lens group.

12. The inner focusing type telephoto zoom lens according to claim 1, wherein said fourth lens group satisfies the following condition:

$$-1.3 < \beta_{4W} < -0.6$$

where $\beta_{4W}$ is a magnification of said fourth lens group at the wideangle end.

13. The inner focusing type telephoto zoom lens according to claim 1, characterized in that said zoom lens is configured according to the following data:

| Angle of view: 12.4° to 4.0° F number: 5.6 | | | | | |
|---|---|---|---|---|---|
| r | d | ν | n | | |
| 1 | 308.948 | 12.00 | 82.6 | 1.49782 | G$_{1F}$ ⎤ |
| 2 | −789.723 | 0.50 | | | |
| 3 | 138.132 | 5.60 | 31.7 | 1.75692 ⎤ | ⎥ G$_1$ |
| 4 | 94.277 | 20.00 | 82.6 | 1.49782 ⎦ | G$_{1R}$ ⎦ |
| 5 | 538.815 | (d5) | | | |
| 6 | −2329.747 | 3.50 | 54.0 | 1.71300 | G$_{2F}$ ⎤ |
| 7 | 163.185 | 5.00 | | | |
| 8 | −400.119 | 3.50 | 49.5 | 1.74443 | ⎥ G$_2$ |

-continued

| | | | | | |
|---|---|---|---|---|---|
| 9 | 142.864 | 1.50 | | | $G_{2R}$ |
| 10 | 147.991 | 6.70 | 31.1 | 1.68893 | |
| 11 | −903.769 | (d11) | | | |
| 12 | 234.078 | 5.50 | 60.3 | 1.62041 | $G_{3F}$ |
| 13 | −708.172 | 0.20 | | | |
| 14 | 186.225 | 3.60 | 27.6 | 1.75520 | $G_{3R}$ |
| 15 | 125.500 | 7.20 | 82.6 | 1.49782 | |
| 16 | −452.333 | (d16) | | | |
| 17 | 7497.915 | 2.10 | 58.5 | 1.65160 | $G_{4F}$ |
| 18 | 70.701 | 5.00 | | | |
| 19 | −75.634 | 2.30 | 54.0 | 1.71300 | $G_{4R}$ |
| 20 | 65.000 | 4.00 | 23.0 | 1.86074 | |
| 21 | 332.191 | (d21) | | | |
| 22 | 182.524 | 7.20 | 58.6 | 1.61272 | $G_5$ |
| 23 | −50.200 | 2.40 | 31.7 | 1.75692 | |
| 24 | −130.192 | (d24) | | | |
| 25 | 67.354 | 4.60 | 82.6 | 1.49782 | $G_{6F}$ |
| 26 | 130.346 | 52.40 | | | |
| 27 | 120.000 | 4.70 | 53.6 | 1.54739 | $G_{6R}$ |
| 28 | −132.300 | 14.80 | | | |
| 29 | −59.600 | 1.80 | 45.4 | 1.79668 | |
| 30 | 100.000 | 5.50 | 54.6 | 1.51454 | |
| 31 | −79.756 | (Bf) | | | |

Infininte focusing distance

| f | 200.000 | 399.999 | 599.998 |
|---|---|---|---|
| D0 | ∞ | ∞ | ∞ |
| d 5 | 68.438 | 68.438 | 68.438 |
| d11 | 26.857 | 26.857 | 26.857 |
| d16 | 4.685 | 39.573 | 50.919 |
| d21 | 75.626 | 37.776 | 1.236 |
| d24 | 9.082 | 12.045 | 37.238 |
| Bf | 113.560 | 113.560 | 113.560 |

Close focusing distance (when the distance R between the close object to the image field is 3001)

| f | 200.000 | 399.999 | 599.998 |
|---|---|---|---|
| β | −0.086 | −0.173 | −0.259 |
| D0 | 2521.122 | 2521.123 | 2521.123 |
| d 5 | 93.923 | 93.923 | 93.923 |
| d11 | 1.371 | 1.371 | 1.371 |
| d16 | 4.685 | 39.573 | 50.919 |
| d21 | 75.626 | 37.776 | 1.236 |
| d24 | 9.082 | 12.045 | 37.238 |
| Bf | 113.560 | 113.560 | 113.560 | wherein the digits on the left represent the order of the lens surfaces with the surface closest to the object being number one, r represents the radius of curvature of the lens surface, d represents the interval between the lens surfaces, n represents the index of refraction, $\nu$ represents the Abbe number, n and $\nu$ being the values relative to the d line ($\lambda = 587.6$ nm), f represents the focal distance of the overall system, Bf represents the back focus, $\beta$ represents the image magnification, and D0 represents the distance from the object side surface (the first surface) of the lens closest to the object.

14. The inner focusing type telephoto zoom lens according to claim 1, characterized in that said zoom lens is configured according to the following data:

Angle of view: 12.4° to 4.0° F number: 5.6

| | r | d | $\nu$ | n | |
|---|---|---|---|---|---|
| 1 | 250.282 | 13.50 | 82.6 | 1.49782 | $G_{1F}$ |
| 2 | −665.781 | 0.40 | | | |
| 3 | 112.729 | 5.50 | 31.7 | 1.75692 | $G_{1R}$ |
| 4 | 77.500 | 20.00 | 82.6 | 1.49782 | |
| 5 | 306.318 | (d5) | | | |
| 6 | −1239.253 | 3.10 | 54.0 | 1.71300 | $G_{2F}$ |
| 7 | 126.042 | 5.90 | | | |
| 8 | −560.767 | 3.10 | 49.5 | 1.74443 | $G_{2R}$ |
| 9 | 137.077 | 1.35 | | | |

-continued

| | | | | | |
|---|---|---|---|---|---|
| 10 | 129.944 | 6.50 | 31.1 | 1.68893 | |
| 11 | −1115.385 | (d11) | | | |
| 12 | 243.331 | 5.00 | 60.3 | 1.62041 | $G_{3F}$ |
| 13 | −713.457 | 0.20 | | | |
| 14 | 182.229 | 3.10 | 35.2 | 1.74950 | $G_{3R}$ |
| 15 | 104.000 | 7.70 | 70.1 | 1.51860 | |
| 16 | −405.171 | (d16) | | | |
| 17 | 425.119 | 2.10 | 60.0 | 1.64000 | $G_{4F}$ |
| 18 | 69.010 | 4.95 | | | |
| 19 | −76.181 | 2.10 | 54.0 | 1.71300 | $G_{4R}$ |
| 20 | 64.000 | 4.00 | 23.0 | 1.86074 | |
| 21 | 306.154 | (d21) | | | |
| 22 | 203.300 | 7.20 | 60.3 | 1.62041 | $G_5$ |
| 23 | −49.500 | 2.40 | 31.7 | 1.75692 | |
| 24 | −126.094 | (d24) | | | |
| 25 | 68.850 | 4.70 | 70.1 | 1.51860 | $G_{6F}$ |
| 26 | 132.997 | 53.50 | | | |
| 27 | 120.513 | 4.80 | 53.6 | 1.54739 | $G_{6R}$ |
| 28 | −138.869 | 15.10 | | | |
| 29 | −62.782 | 2.30 | 45.4 | 1.79668 | |
| 30 | 96.998 | 5.00 | 54.6 | 1.51454 | |
| 31 | −88.457 | (Bf) | | | |

Infininte focusing distance

| f | 200.000 | 400.000 | 600.000 |
|---|---|---|---|
| D0 | ∞ | ∞ | ∞ |
| d 5 | 54.725 | 54.725 | 54.725 |
| d11 | 22.093 | 23.093 | 23.093 |
| d16 | .324 | 37.128 | 49.173 |
| d21 | 74.459 | 39.072 | 4.518 |
| d24 | 9.465 | 8.048 | 30.556 |
| Bf | 119.640 | 119.640 | 119.640 |

Close focusing distance (when the distance R between the close object to the image field is 2995)

| f | 200.000 | 400.000 | 600.000 |
|---|---|---|---|
| β | −0.085 | −0.170 | −0.256 |
| D0 | 2530.154 | 2530.154 | 2530.154 |
| d 5 | 74.355 | 74.355 | 74.355 |
| d11 | 3.463 | 3.463 | 3.463 |
| d16 | 0.324 | 37.128 | 49.173 |
| d21 | 74.459 | 39.072 | 4.518 |
| d24 | 9.465 | 8.048 | 30.556 |
| Bf | 119.640 | 119.640 | 119.640 | wherein the digits on the left represent the order of the lens surfaces with the surface closest to the object being number one, r represents the radius to curvature of the lens surface, d represents the interval between the lens surfaces, n represents the index of refraction, $\nu$ represents the Abbe number, n and $\nu$ being the values relative to the d line ($\lambda = 587.6$ nm), f represents the focal distance of the overall system, Bf represents the back focus, $\beta$ represents the image magnification, and D0 represents the distance from the object side surface (the first surface) of the lens closest to the object.

15. The inner focusing type telephoto zoom lens according to claim 1, characterized in that said zoom lens is configured according to the following data:

Angle of view: 12.4° to 4.0° F number: 5.6

| | r | d | $\nu$ | n | |
|---|---|---|---|---|---|
| 1 | 306.274 | 12.00 | 82.6 | 1.49782 | $G_{1F}$ |
| 2 | −856.901 | 0.50 | | | |
| 3 | 139.117 | 5.60 | 31.7 | 1.75692 | $G_{1R}$ |
| 4 | 94.500 | 20.00 | 82.6 | 1.49782 | |
| 5 | 587.538 | (d5) | | | |
| 6 | −906.010 | 3.50 | 50.3 | 1.72000 | $G_{2F}$ |
| 7 | 154.841 | 6.00 | | | |
| 8 | −406.520 | 3.50 | 49.5 | 1.74443 | $G_{2R}$ |
| 9 | 190.000 | 6.00 | 31.1 | 1.68893 | |

-continued

| | | | | | | |
|---|---|---|---|---|---|---|
| 10 | −528.609 | (d10) | | | | |
| 11 | 234.078 | 5.50 | 57.0 | 1.62280 | $G_{3F}$ | |
| 12 | −719.345 | 0.20 | | | | $G_3$ |
| 13 | 215.355 | 3.60 | 27.6 | 1.75520 | $G_{3R}$ | |
| 14 | 145.000 | 7.20 | 70.1 | 1.51860 | | |
| 15 | −417.630 | (d15) | | | | |
| 16 | 7497.915 | 2.10 | 57.6 | 1.67025 | $G_{4F}$ | |
| 17 | 71.432 | 5.00 | | | | $G_4$ |
| 18 | −75.818 | 2.30 | 54.0 | 1.71300 | $G_{4R}$ | |
| 19 | 65.000 | 4.00 | 23.0 | 1.86074 | | |
| 20 | 350.389 | (d20) | | | | |
| 21 | 147.921 | 7.20 | 70.2 | 1.48749 | | $G_5$ |
| 22 | −48.000 | 2.40 | 31.1 | 1.68893 | | |
| 23 | −95.814 | (d23) | | | | |
| 24 | 64.700 | 4.60 | 59.0 | 1.51823 | $G_{6F}$ | |
| 25 | 107.229 | 52.40 | | | | |
| 26 | 120.000 | 4.70 | 57.0 | 1.62280 | | $G_6$ |
| 27 | −158.000 | 14.80 | | | | |
| 28 | −65.700 | 1.80 | 45.4 | 1.79668 | $G_{6R}$ | |
| 29 | 63.000 | 5.50 | 54.0 | 1.61720 | | |
| 30 | −117.108 | (Bf) | | | | |

Infininte focusing distance

| f | 200.000 | 399.999 | 599.998 |
|---|---|---|---|
| D0 | ∞ | ∞ | ∞ |
| d 5 | 68.558 | 68.558 | 68.558 |
| d10 | 27.720 | 27.720 | 27.720 |
| d15 | 5.085 | 39.972 | 51.319 |
| d20 | 74.959 | 37.109 | 0.569 |
| d23 | 5.954 | 8.916 | 34.109 |
| Bf | 116.495 | 116.494 | 116.494 |

Close focusing distance (when the distance R between the close object to the image field is 3000)

| f | 200.000 | 399.999 | 599.998 |
|---|---|---|---|
| β | −0.086 | −0.173 | −0.259 |
| D0 | 2520.829 | 2520.830 | 2520.830 |
| D 5 | 94.043 | 94.043 | 94.043 |
| d10 | 2.235 | 2.235 | 2.235 |
| d15 | 5.085 | 39.972 | 51.319 |
| d20 | 74.959 | 37.109 | 0.569 |
| d23 | 5.954 | 8.916 | 34.109 |
| Bf | 116.495 | 116.494 | 116.494 | wherein the digits on the left represent the order of the lens surfaces with the surface closest to the object being number one, r represents the radius of curvature of the lens surface d, represents the interval between the lens surfaces, n represents the index of refraction, ν represents the Abbe number, n and ν being the values relative to the d line (λ=587.6 nm), f represents the focal distance of the overall system, Bf represents the back focus, β represents the image magnification, and D0 represents the distance from the object side surface (the first surface) of the lens closest to the object.

16. The inner focusing type telephoto zoom lens according to claim 1, characterized in that said zoom lens is configured according to the following data:

Angle of view: 12.4° to 4.0° F number: 5.6

| | r | d | ν | n | | |
|---|---|---|---|---|---|---|
| 1 | 321.821 | 12.00 | 82.6 | 1.49782 | $G_{1F}$ | |
| 2 | −729.411 | 0.20 | | | | $G_1$ |
| 3 | 136.902 | 5.80 | 31.7 | 1.75692 | $G_{1R}$ | |
| 4 | 93.500 | 19.00 | 82.6 | 1.49782 | | |
| 5 | 441.164 | (d5) | | | | |
| 6 | −2227.832 | 3.90 | 54.0 | 1.71300 | $G_{2F}$ | |
| 7 | 173.140 | 5.70 | | | | $G_2$ |
| 8 | −455.080 | 3.90 | 49.5 | 1.74443 | $G_{2R}$ | |
| 9 | 57.808 | 1.70 | | | | |
| 10 | 68.319 | 7.60 | 31.1 | 1.68893 | | |
| 11 | −626.652 | (d11) | | | | |
| 12 | 211.907 | 5.20 | 60.3 | 1.62041 | $G_{3F}$ | |
| 13 | −736.731 | 0.20 | | | | $G_3$ |
| 14 | 196.394 | 3.20 | 27.6 | 1.75520 | $G_{4R}$ | |
| 15 | 124.000 | 7.20 | 82.6 | 1.49782 | | |
| 16 | −600.710 | (d16) | | | | |
| 17 | 7570.710 | 2.00 | 58.5 | 1.65160 | $G_{4F}$ | |
| 18 | 68.030 | 5.50 | | | | $G_4$ |
| 19 | −76.369 | 2.30 | 54.0 | 1.71300 | | |
| 20 | 65.631 | 4.00 | 23.0 | 1.86074 | | |
| 21 | 409.227 | (d21) | | | | |
| 22 | 176.858 | 6.90 | 57.0 | 1.62280 | | $G_5$ |
| 23 | −48.000 | 2.30 | 31.7 | 1.75692 | | |
| 24 | −131.074 | (d24) | | | | |
| 25 | 72.169 | 5.00 | 82.6 | 1.49782 | $G_{6F}$ | |
| 26 | 142.978 | 49.00 | | | | |
| 27 | 123.125 | 5.10 | 53.6 | 1.54739 | | $G_6$ |
| 28 | −116.000 | 16.30 | | | | |
| 29 | −60.000 | 2.00 | 45.4 | 1.79668 | $G_{6R}$ | |
| 30 | 109.778 | 6.00 | 60.3 | 1.51835 | | |
| 31 | −108.343 | (Bf) | | | | |

Infininte focusing distance

| f | 200.000 | 400.000 | 600.000 |
|---|---|---|---|
| D0 | ∞ | ∞ | ∞ |
| D 5 | 63.989 | 63.989 | 63.989 |
| d11 | 25.782 | 25.782 | 25.782 |
| d16 | 0.250 | 38.473 | 50.858 |
| d21 | 72.139 | 36.625 | 2.290 |
| d24 | 34.246 | 31.537 | 53.487 |
| Bf | 119.861 | 119.861 | 119.861 |

Close focusing distance (when the distance R between the close object to the image field is 3301)

| f | 200.000 | 400.000 | 600.000 |
|---|---|---|---|
| β | −0.077 | −0.154 | −0.231 |
| D0 | 2802.624 | 2802.624 | 2802.624 |
| D 5 | 88.861 | 88.861 | 88.861 |
| d11 | 0.910 | 0.910 | 0.910 |
| d16 | 0.250 | 38.473 | 50.858 |
| d21 | 72.139 | 36.625 | 2.290 |
| d24 | 34.246 | 31.537 | 53.487 |
| Bf | 119.861 | 119.861 | 119.862 | wherein the digits on the left represent the order of the lens surfaces with the surface closest to the object being number one, r represents the radius of curvature of the lens surface, d represents the interval between the lens surfaces, n represents the index of refraction, ν represents the Abbe number, n and ν being the values relative to the d line (λ=587.6 nm), f represents the focal distance of the overall system, Bf represents the back focus, β represents the image magnification, and D0 represents the distance from the object side surface (the first surface) of the lens closest to the object.

17. The inner focusing type telephoto zoom lens according to claim 1, characterized in that said zoom lens is configured according to the following data:

Angle of view: 12.4° to 4.0° F number: 5.6

| | r | d | ν | n | | |
|---|---|---|---|---|---|---|
| 1 | 290.868 | 12.00 | 82.6 | 1.49782 | $G_{1F}$ | |
| 2 | −774.673 | 0.50 | | | | $G_1$ |
| 3 | 135.585 | 5.60 | 31.7 | 1.75692 | $G_{1R}$ | |
| 4 | 92.000 | 20.00 | 82.6 | 1.49782 | | |
| 5 | 455.551 | (d5) | | | | |
| 6 | −11562.773 | 3.50 | 64.1 | 1.51680 | | |
| 7 | 135.000 | 6.00 | 29.5 | 1.71736 | $G_{2F}$ | $G_2$ |
| 8 | 206.390 | 5.00 | | | | |
| 9 | −1945.925 | 3.50 | 60.7 | 1.60311 | $G_{2R}$ | |
| 10 | 155.393 | (d10) | | | | |
| 11 | 220.000 | 5.50 | 64.1 | 1.51680 | $G_{3F}$ | |
| 12 | −336.868 | 0.20 | | | | |

-continued

| | | | | | | |
|---|---|---|---|---|---|---|
| 13 | 190.649 | 3.60 | 25.5 | 1.80458 | | G3 |
| 14 | 138.000 | 7.20 | 64.1 | 1.51680 | G3R | |
| 15 | −841.391 | (d15) | | | | |
| 16 | 965.857 | 3.50 | 27.6 | 1.75520 | G4F | |
| 17 | −115.000 | 2.00 | 47.1 | 1.67003 | | G4 |
| 18 | 63.514 | 5.00 | | | | |
| 19 | −66.729 | 2.30 | 45.1 | 1.74400 | G4R | |
| 20 | 74.000 | 4.00 | 23.0 | 1.86074 | | |
| 21 | 1917.110 | (d21) | | | | |
| 22 | 145.000 | 7.20 | 70.2 | 1.48749 | | G5 |
| 23 | −50.000 | 2.40 | 31.7 | 1.75692 | | |
| 24 | −91.173 | (d24) | | | | |
| 25 | 63.000 | 4.60 | 82.6 | 1.49782 | G6F | |
| 26 | 101.589 | 52.40 | | | | |
| 27 | 117.000 | 4.70 | 59.6 | 1.60729 | | G6 |
| 28 | −169.393 | 14.80 | | | | |
| 29 | −67.051 | 1.80 | 39.6 | 1.80454 | G6R | |
| 30 | 61.641 | 5.50 | 39.2 | 1.62606 | | |
| 31 | −104.489 | (Bf) | | | | |

Infinite focusing distance

| f | 200.000 | 399.999 | 599.998 |
|---|---|---|---|
| D0 | ∞ | ∞ | ∞ |
| d 5 | 57.607 | 57.607 | 57.607 |
| d10 | 38.752 | 38.752 | 38.752 |
| d15 | 2.561 | 37.449 | 48.795 |
| d21 | 74.751 | 36.901 | 0.361 |
| d24 | 1.437 | 4.400 | 29.593 |
| Bf | 120.170 | 120.170 | 120.170 |

Close focusing distance (when the distance R between the close object to the image field is 3004)

| f | 200.000 | 399.999 | 599.998 |
|---|---|---|---|
| β | −0.086 | −0.172 | −0.259 |
| D0 | 2526.102 | 2526.102 | 2526.102 |
| d 5 | 83.070 | 83.070 | 83.070 |
| d11 | 13.289 | 13.289 | 13.289 |
| d16 | 2.561 | 37.449 | 48.795 |
| d21 | 74.751 | 36.901 | 0.361 |
| d24 | 1.437 | 4.400 | 29.593 |
| Bf | 120.170 | 120.170 | 120.170 | wherein the digits on the left represent the order of the lens surfaces with the surface closest to the object being number one, r represents the radius of curvature of the lens surface, d represents the interval between the lens surfaces, n represents the index of refraction, ν represents the Abbe number, n and ν being the values relative to the d line (λ=587.6 nm), f represents the focal distance of the overall system, Bf represents the back focus, β represents the image magnification, and D0 represents the distance from the object side surface (the first surface) of the lens closest to the object.

18. An inner focusing type telephoto zoom lens, comprising:
a fixed first lens group having a positive refractive power, the first lens group being disposed closest to the object, said first lens group including a front subgroup consisting of a positive lens having two convex surfaces, and a rear subgroup consisting of a negative meniscus lens whose surface located on the object side is convex and a positive meniscus lens whose surface located on the object side is convex;
a second lens group having a negative refractive power, the second lens group being movable along an optical axis for focusing, said second lens group including a front subgroup consisting of a negative lens whose surface located on the image side has a larger radius of curvature and a rear subgroup consisting of a negative lens having two concave surfaces and a positive lens whose surface located on the object side has a larger radius of curvature;
a fixed third lens group having a positive refractive power, said third lens group including a front subgroup having a positive lens having two convex surfaces, and a rear subgroup consisting of a negative meniscus lens whose surface located on the object side is convex and a positive lens cemented to said negative meniscus lens such that a surface located on the object side has a larger radius of curvature;
a fourth lens group having a negative refractive power, the fourth lens group being movable along the optical axis for zooming, said fourth lens group including a front subgroup consisting of a negative lens whose surface located on the image side has a larger radius of curvature, and a rear subgroup consisting of a negative lens having two concave surfaces and a positive lens cemented to said negative lens such that a surface thereof located on the object side has a larger radius of curvature;
a fifth lens group having a positive refractive power, the fifth lens group being movable along the optical axis relative to the fourth lens group, said fifth lens group including a positive lens whose surface located on the image side has a larger radius of curvature, and a negative meniscus lens cemented to said positive lens such that a surface thereof located on the object side is concave; and
a fixed sixth lens group having a positive refractive power, said sixth lens group including a positive meniscus lens whose surface located on the object side is convex, a positive lens having two convex surfaces, a negative lens having two concave surfaces, and a positive lens cemented to said negative lens and having two convex surfaces.

19. The inner focusing type telephoto zoom lens according to claim 18, wherein said second lens group satisfies the following condition:

$$0.4 < |f_2|/f_{123} < 0.9$$

where $f_{123}$ is a composite focal length of said first, second and third lens groups, and $f_2$ indicates a focal length of said second lens group.

20. The inner focusing type telephoto zoom lens according to claim 18, wherein said first lens group satisfies the following condition:

$$40 < \nu_{1p} - \nu_{1n} < 70$$

where $\nu_{1p}$ is an average Abbe number of said positive lens and $\nu_{1n}$ is an average Abbe number of said negative lens.

21. The inner focusing type telephoto zoom lens according to claim 18, wherein said second lens group satisfies the following condition:

$$10 < \nu_{2n} - \nu_{2p} < 40$$

where $\nu_2$ is an average Abbe number of the positive lens, and $\nu_{2n}$ is an average Abbe number of the negative lens.

22. The inner focusing type telephoto zoom lens according to claim 18, wherein said first, second and fourth lens groups satisfy the following conditions:

$$0.3 < f_{1F}/f_{1R} < 1.0,\ 0.1 < f_{2F}/f_{2R} < 7$$

-continued $$0.3 < \frac{rb + ra}{rb - ra} < 0.6, -1 < \frac{rd + rc}{rd - rc} < 8$$

$$-0.2 < \frac{rf + re}{rf - re} < 0.2, 0.01 < f_T/f_{12} < 0.3$$

where
- $f_{1F}$: a focal length of said front subgroup in said first lens group
- $f_{1R}$: a focal length of said rear subgroup in said first lens group
- $f_{2F}$: a focal length of said front subgroup in said second lens group
- $f_{2R}$: a focal length of said rear subgroup in said second lens group
- $r_a$: a radius of curvature of a surface disposed closest to the object in said front subgroup of said first lens group
- $r_b$: a radius of curvature of a surface disposed closest to the image field in said front subgroup of said first lens group
- $r_c$: a radius of curvature of a surface disposed said second lens group
- $r_d$: a radius of curvature of a surface disposed closest to the image field in said rear subgroup of said second lens group
- $r_e$: a radius of curvature of a surface disposed closest to the object in an air lens formed between said front and rear subgroups of said fourth lens group
- $r_f$: a radius of curvature of a surface disposed closest to the image field in said air lens formed between said front and rear subgroups of said fourth lens group
- $f_{12}$: a composite focal length of said first and second lens groups
- $f_T$: a focal distance of the zoom lens at the telephoto end 23. The inner focusing type telephoto zoom lens according to claim 18, wherein the rear subgroup of each of said first and fourth lens groups satisfies the following conditions:

$$1.1 < |\phi_{1C}/\phi_{1R}| < 1.8$$

$$0.12 < \phi|\phi_{4C}/\phi_{4R}| < 0.3$$

where $\phi_{1R}$ is the refractive power of said rear subgroup of said first lens group, $\phi_{1C}$ is the surface refractive power of the cemented surface in said rear subgroup of said first lens group, $\phi_{4R}$ is the refractive power of said rear subgroup of said fourth lens group, and $\phi_{4C}$ is the surface refractive power of the cemented surface in said rear subgroup of said fourth lens group.

24. The inner focusing type telephoto zoom lens according to claim 18, wherein said negative lens having the two concave surfaces and said positive lens in said rear subgroup of said second lens group are separated from each other such that a meniscus air lens whose surface located on the object side is convex can be formed, and satisfy the following condition:

$$0.5 < \phi_{2C}/\phi_2 < 0.9$$

where $\phi_2$ is the refractive power of said second lens group and $\phi_{2C}$ is the surface refractive power of the image side surface of said negative lens having the two concave surfaces.

25. The inner focusing type telephoto zoom lens according to claim 18, wherein said negative meniscus lens and said positive meniscus lens which form said rear subgroup of said first lens group are cemented to each other, and wherein said negative lens having the two concave surfaces and said positive lens which form said rear subgroup of said second lens group are also cemented to each other.

26. An inner focusing type telephoto zoom lens, comprising:
- a fixed first lens group having a positive refractive power, the first lens group being disposed closest to the object, said first lens group including a positive lens having two convex surfaces, a negative meniscus lens whose surface located on the object side is convex, and a positive meniscus lens cemented to said negative meniscus lens such that a surface thereof located on the object side is convex;
- a second lens group having a negative refractive power, the second lens group being movable along an optical axis for focusing, said second lens group including a negative meniscus lens whose surface located on the image side has a larger radius of curvature, a positive meniscus lens cemented to said negative meniscus lens such that a surface thereof located on the object side is convex, and a negative meniscus lens whose surface located on the image side has a larger radius of curvature;
- a fixed third lens group having a positive refractive power, said third lens group including a positive lens having two convex surfaces, a negative meniscus lens whose surface located on the object side is convex, and a positive lens cemented to said negative meniscus lens such that a surface located on the object side has a larger radius of curvature;
- a fourth lens group having a negative refractive power, the fourth lens group being movable along the optical axis for zooming, said fourth lens group including a positive lens having two convex surfaces the surface of which located on the image side has a larger radius of curvature, a negative lens cemented to said positive lens and having two concave surfaces, another negative lens having two concave surfaces, and a positive meniscus lens cemented to said another negative lens such that a surface thereof located on the object side has a larger radius of curvature;
- a fifth lens group having a positive refractive power, the fifth lens group being movable along the optical axis relative to the fourth lens group, said fifth lens group including a positive lens whose surface located on the image side has a larger radius of curvature, and a negative meniscus lens cemented to said positive lens such that a surface thereof located on the object side is concave; and
- a fixed sixth lens group having a positive refractive power, said sixth lens group including a positive meniscus lens whose surface located on the object side is convex, a positive lens having two convex surfaces, a negative lens having two concave surfaces, and a positive lens cemented to said negative lens and having two convex surfaces.

27. The inner focusing type telephoto zoom lens according to claim 26, wherein said second lens group satisfies the following condition:

$$0.4 < |f_2|/f_{123} < 0.9$$

where $f_{123}$ is a composite focal length of said first, second and third lens groups, and $f_2$ indicates a focal length of said second lens group.

28. The inner focusing type telephoto zoom lens according to claim 26, wherein said first lens group satisfies the following condition:

$$40 < \nu_{1p} - \nu_{1n} < 70$$

where $\nu_{1p}$ is an average Abbe number of said positive lens and $\nu_{1n}$ is an average Abbe number of said negative lens.

29. The inner focusing type telephoto zoom lens according to claim 26, wherein said second lens group satisfies the following condition:

$$10 < \nu_{2n} - \nu_{2p} < 40$$

where $\nu_{2p}$ is an average Abbe number of the positive lens, and $\nu_{2n}$ is an average Abbe number of the negative lens.

30. The inner focusing type telephoto zoom lens according to claim 26, wherein said first, second and fourth lens groups satisfy the following conditions:

$$0.3 < f_{1F}/f_{1R} < 1.0, \quad 0.1 < f_{2F}/f_{2R} < 7$$

$$0.3 < \frac{rb + ra}{rb - ra} < 0.6, \quad -1 < \frac{rd + rc}{rd - rc} < 8$$

$$-0.2 < \frac{rf + re}{rf - re} < 0.2, \quad 0.01 < f_T/f_{12} < 0.3$$

where
 $f_{1F}$: a focal length of said front subgroup in said first lens group
 $f_{1R}$: a focal length of said rear subgroup in said first lens group
 $f_{2F}$: a focal length of said front subgroup in said second lens group
 $f_{2R}$: a focal length of said rear subgroup in said second lens group
 $r_a$: a radius of curvature of a surface disposed closest to the object in said front subgroup of said first lens group
 $r_b$: a radius of curvature of a surface disposed closest to the image field in said front subgroup of said first lens group
 $r_c$: a radius of curvature of a surface disposed closest to the object in said rear subgroup of said second lens group
 $r_d$: a radius of curvature of a surface disposed closest to the image field in said rear subgroup of said second lens group
 $r_e$: a radius of curvature of a surface disposed closest to the object in an air lens formed between said front and rear subgroups of said fourth lens group
 $r_f$: a radius of curvature of a surface disposed closest to the image field in said air lens formed between said front and rear subgroups of said fourth lens group
 $f_{12}$: a composite focal length of said first and second lens groups
 $f_T$: a focal distance of the zoom lens at the telephoto end.

31. The inner focusing type telephoto zoom lens according to claim 26, wherein the rear subgroup of each of said first and fourth lens groups satisfies the following conditions:

$$1.1 < |\phi_{1C}/\phi_{1R}| < 1.8$$

$$0.12 < |\phi_{4C}/\phi_{4R}| < 0.3$$

where $\phi_{1R}$ is the refractive of said subgroup of said first lens group, $\phi_{1C}$ is the surface refractive power of the cemented surface in said rear subgroup of said first lens group, $\phi_{4R}$ is the refractive power of said rear subgroup of said fourth lens group, and $\phi_{4C}$ is the surface refractive power of the cemented surface in said rear subgroup of said fourth lens group.

32. The inner focusing type telephoto zoom lens according to claim 1, characterized in that said zoom lens is configured according to the following data:

| Angle of view: 12.4° to 4.0° F number: 5.6 | | | | | |
|---|---|---|---|---|---|
| | r | d | ν | n | |
| 1 | 282.706 | 12.00 | 82.6 | 1.49782 | $G_{1F}$ |
| 2 | −892.613 | 0.50 | | | |
| 3 | 130.000 | 5.60 | 31.7 | 1.75692 | $G_{1R}$ $G_1$ |
| 4 | 89.000 | 20.00 | 82.6 | 1.49782 | |
| 5 | 407.679 | (d5) | | | |
| 6 | −1248.466 | 3.50 | 54.0 | 1.71300 | $G_{2F}$ |
| 7 | 141.163 | 5.50 | | | |
| 8 | −626.031 | 3.50 | 49.5 | 1.74443 | $G_2$ |
| 9 | 153.034 | 1.50 | | | $G_{2R}$ |
| 10 | 148.647 | 6.70 | 31.1 | 1.68893 | |
| 11 | −986.249 | (d11) | | | |
| 12 | 234.078 | 5.50 | 60.3 | 1.62041 | $G_{3F}$ |
| 13 | −708.172 | 0.20 | | | $G_3$ |
| 14 | 181.038 | 3.10 | 31.7 | 1.75692 | $G_{3R}$ |
| 15 | 108.000 | 7.70 | 70.1 | 1.51860 | |
| 16 | −457.625 | (d16) | | | |
| 17 | 7497.915 | 2.10 | 58.5 | 1.65160 | $G_{4F}$ |
| 18 | 66.642 | 5.00 | | | $G_4$ |
| 19 | −73.353 | 2.30 | 54.0 | 1.71300 | $G_{4R}$ |
| 20 | 69.000 | 4.00 | 23.0 | 1.86074 | |
| 21 | 520.648 | (d21) | | | |
| 22 | 195.649 | 7.20 | 58.6 | 1.61272 | |
| 23 | −49.500 | 2.40 | 31.7 | 1.75692 | $G_5$ |
| 24 | −124.538 | (d24) | | | |
| 25 | 69.300 | 4.60 | 82.6 | 1.49782 | $G_{6F}$ |
| 26 | 131.261 | 52.40 | | | |
| 27 | 118.000 | 4.70 | 53.6 | 1.54739 | $G_6$ |
| 28 | −135.500 | 14.80 | | | |
| 29 | −63.000 | 2.30 | 45.4 | 1.79668 | $G_{6R}$ |
| 30 | 95.000 | 5.20 | 56.5 | 1.50137 | |
| 31 | −78.644 | (Bf) | | | |

| Infinite focusing distance | | | |
|---|---|---|---|
| f | 200.000 | 399.999 | 599.998 |
| D0 | ∞ | ∞ | ∞ |
| d 5 | 67.792 | 67.792 | 67.792 |
| d11 | 25.445 | 25.445 | 25.445 |
| d16 | 5.080 | 39.968 | 51.314 |
| d21 | 75.088 | 37.238 | 0.698 |
| d24 | 3.209 | 6.172 | 31.365 |
| Bf | 116.226 | 116.226 | 116.226 |

| Close focusing distance (when the distance R between the close object to the image field is 3083) | | | |
|---|---|---|---|
| f | 200.000 | 399.999 | 599.998 |
| β | −0.083 | −0.167 | −0.250 |
| D0 | 2607.746 | 2607.747 | 2607.747 |
| d 5 | 92.362 | 92.362 | 92.362 |
| d11 | 0.875 | 0.875 | 0.875 |
| d16 | 5.080 | 39.968 | 51.314 |
| d21 | 75.088 | 37.238 | 0.698 |
| d24 | 3.209 | 6.172 | 31.365 |
| Bf | 116.226 | 116.226 | 116.226 | wherein the digits on the left represent the order of the lens surfaces with the surface closest to the object being number one, r represents the radius of curvature of the lens surface, d represents the interval between the lens surfaces, n represents the index of refraction, ν represents the Abbe number, n and ν being the values relative to the d line (λ=587.6 nm), f represents the focal distance of the overall system, Bf represents the back focus, β represents the image magnification, and D0 represents the distance from the object side surface (the first surface) of the lens closest to the object.

* * * * *